(12) United States Patent
Hase et al.

(10) Patent No.: US 7,689,512 B2
(45) Date of Patent: Mar. 30, 2010

(54) LICENSE MANAGEMENT APPARATUS CAPABLE OF EFFICIENTLY EXECUTING JOB OR WORKFLOW, LICENSE MANAGEMENT SYSTEM, LICENSE MANAGEMENT METHOD, AND RECORDING MEDIUM

(75) Inventors: Junichi Hase, Osaka (JP); Fumiko Uchino, Otokuni-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 11/412,140

(22) Filed: Apr. 27, 2006

(65) Prior Publication Data
US 2007/0179899 A1 Aug. 2, 2007

(30) Foreign Application Priority Data
Jan. 30, 2006 (JP) .............................. 2006-020999

(51) Int. Cl.
*G06F 17/60* (2006.01)
(52) U.S. Cl. ........................................................ 705/59
(58) Field of Classification Search .................... 705/59
See application file for complete search history.

(56) References Cited

U.S. PATENT DOCUMENTS 5,438,508 A * 8/1995 Wyman .......................... 705/8

| 2003/0009423 A1* | 1/2003 | Wang et al. ................... 705/51 |
| 2003/0072448 A1 | 4/2003 | Nakamura et al. |
| 2005/0137984 A1* | 6/2005 | Nguyen et al. ................ 705/51 |

FOREIGN PATENT DOCUMENTS

| JP | 8063417 | 3/1996 |
| JP | 9-190316 | 7/1997 |
| JP | 2003-122537 | 4/2003 |
| JP | 2003-256064 | 9/2003 |
| JP | 2003-323224 | 11/2003 |
| JP | 2005-25616 | 1/2005 |
| JP | 2006173692 A * | 6/2006 |

OTHER PUBLICATIONS

Japanese Office Action dated Feb. 5, 2008 (with English Translation).

* cited by examiner

*Primary Examiner*—Pierre E Elisca
(74) *Attorney, Agent, or Firm*—Buchanan Ingersoll & Rooney PC

(57) ABSTRACT

A license management apparatus, a license management system, a license management method, and a recording medium are provided, in which a job or a work flow is executed efficiently. The order of grant of a license is controlled according to a grant request for a license for a function necessary to execute a job or a workflow.

30 Claims, 17 Drawing Sheets

FIG.3A

LICENSE NUMBER MANAGEMENT TABLE  T200

| FUNCTION NAME | LICENSE NUMBER |
|---|---|
| SCAN | 3 |
| PRINT | 3 |
| TRANSMISSION | 1 |
| IMAGE PROCESSING | 1 |
| A | 1 |
| B | 1 |

FIG.3B

LICENSE NUMBER MANAGEMENT TABLE  T200A

| FUNCTION NAME | LICENSE NUMBER |
|---|---|
| SCAN | 2 |
| PRINT | 3 |
| TRANSMISSION | 0 |
| IMAGE PROCESSING | 0 |
| A | 1 |
| B | 1 |

LICENSE GRANT REQUEST INFORMATION     D100

| DATA KIND | GRANT REQUEST | | |
|---|---|---|---|
| USER NAME | higashi | | |
| WORKFLOW NUMBER | 2005022000024 | | |
| STARTING TIME OF USE | 2005/2/20 11:50 | DURATION OF USE | |
| USE SCAN FUNCTION | YES | 0:30 | |
| USE TRANSMISSION FUNCTION | YES | 0:03 | |
| USE IMAGE PROCESSING FUNCTION | YES | 0:48 | |

FIG.9

LICENSE USE MANAGEMENT TABLE                                                                                                    T300

| PRIORITY | MANAGEMENT INFORMATION | | REGISTRATION INFORMATION | | | | LICENSE INFORMATION | | |
|---|---|---|---|---|---|---|---|---|---|
|  | NUMBER | STATUS | REGISTERER | USER | WORKFLOW NUMBER (JOB NUMBER) | REGISTRATION DATE AND TIME | START | DURATION | USE FUNCTION |
| ... | ... | ... | ... | ... | ... | ... | ... | ... | ... |
|  | 103 | GRANTED | 192.168.2.2 | higashi | 20050220000024 | 2005/2/20 14:21 | 14:21 | 0:07 | SCAN |
|  | 104 | GRANTED | 192.168.2.2 | higashi | 20050220000024 | 2005/2/20 14:21 | 14:21 | 0:07 | IMAGE PROCESSING |
|  | 105 | GRANTED | 192.168.2.2 | higashi | 20050220000024 | 2005/2/20 14:21 | 14:21 | 0:07 | TRANSMISSION |
| 1 | 106 | RESERVED | 192.168.2.5 | nishi | 20050220000045 | 2005/2/20 14:25 | 14:30 | 0:05 | SCAN |
| 1 | 107 | RESERVED | 192.168.2.5 | nishi | 20050220000045 | 2005/2/20 14:25 | 14:30 | 0:05 | PRINT |
| 2 | 108 | RESERVED | 192.168.2.5 | higashi | 20050220000043 | 2005/2/20 14:22 | 14:30 | 0:05 | SCAN |
| 2 | 109 | RESERVED | 192.168.2.5 | higashi | 20050220000043 | 2005/2/20 14:22 | 14:30 | 0:05 | PRINT |
| 3 | 110 | RESERVED | 192.168.2.3 | nishi | 20050220000027 | 2005/2/20 14:22 | 14:30 | 0:05 | SCAN |
| 3 | 111 | RESERVED | 192.168.2.3 | nishi | 20050220000027 | 2005/2/20 14:22 | 14:30 | 0:05 | PRINT |
| 4 | 112 | RESERVED | 192.168.2.5 | nishi | 20050220000046 | 2005/2/20 14:30 | 14:30 | 0:32 | SCAN |
| 4 | 113 | RESERVED | 192.168.2.5 | nishi | 20050220000046 | 2005/2/20 14:30 | 14:30 | 0:32 | PRINT |
| 5 | 114 | RESERVED | 192.168.2.3 | higashi | 20050220000028 | 2005/2/20 14:24 | 14:30 | 0:02 | SCAN |
| 5 | 115 | RESERVED | 192.168.2.3 | higashi | 20050220000028 | 2005/2/20 14:24 | 14:30 | 0:02 | PRINT |
|  | ... | ... | ... | ... | ... | ... | ... | ... | ... |

FIG.11A

GRANT NOTICE                                         D120

| DATA KIND | GRANT NOTICE |
|---|---|
| WORKFLOW NUMBER | 2005022000024 |
| STATUS | SUCCESS |
| SCAN FUNCTION | 151 |
| TRANSMISSION FUNCTION | 190 |
| IMAGE PROCESSING FUNCTION | 201 |

} GRANT MANAGEMENT NUMBER

FIG.11B

RETURN NOTICE                                        D140A

| DATA KIND | RETURN NOTICE |
|---|---|
| WORKFLOW NUMBER | 2005022000024 |
| STATUS | RETURN |
| SCAN FUNCTION | 151 |
| TRANSMISSION FUNCTION | 190 |
| IMAGE PROCESSING FUNCTION | 201 |

} RETURN MANAGEMENT NUMBER

FIG.20
LICENSE USE MANAGEMENT TABLE                                                                                                    T300A

| PRIORITY | MANAGEMENT INFORMATION | | REGISTRATION INFORMATION | | | | LICENSE INFORMATION | | |
|---|---|---|---|---|---|---|---|---|---|
| | NUMBER | STATUS | REGISTERER | USER | WORKFLOW NUMBER (JOB NUMBER) | REGISTRATION DATE AND TIME | START | DURATION | USE FUNCTION |
| | ... | ... | ... | ... | ... | ... | ... | ... | ... |
| | 103 | GRANTED | 192.168.2.2 | higashi | 2005022000024 | 2005/8/8 14:21 | 14:21 | 0:07 | OCR |
| | 104 | GRANTED | 192.168.2.2 | higashi | 2005022000024 | 2005/8/8 14:21 | 14:21 | 0:07 | FILE TRANSMISSION |
| | 105 | GRANTED | 192.168.2.2 | higashi | 2005022000024 | 2005/8/8 14:21 | 14:21 | 0:07 | MAIL TRANSMISSION |
| 1 | 106 | RESERVED | 192.168.2.5 | nishi | 2005022000045 | 2005/8/8 14:25 | 14:30 | 0:05 | IMAGE PROCESSING B |
| 1 | 107 | RESERVED | 192.168.2.5 | nishi | 2005022000045 | 2005/8/8 14:25 | 14:30 | 0:05 | FAX |
| 2 | 108 | RESERVED | 192.168.2.5 | higashi | 2005022000043 | 2005/8/8 14:22 | 14:30 | 0:05 | FILE FORMAT CONVERSION |
| 2 | 109 | RESERVED | 192.168.2.5 | higashi | 2005022000043 | 2005/8/8 14:22 | 14:30 | 0:05 | OCR |
| 3 | 110 | RESERVED | 192.168.2.3 | nishi | 2005022000027 | 2005/8/8 14:22 | 14:30 | 0:05 | IMAGE PROCESSING A |
| 3 | 111 | RESERVED | 192.168.2.3 | nishi | 2005022000027 | 2005/8/8 14:22 | 14:30 | 0:05 | ENCRYPTION |
| 4 | 112 | RESERVED | 192.168.2.5 | nishi | 2005022000046 | 2005/8/8 14:30 | 14:30 | 0:32 | FAX |
| 4 | 113 | RESERVED | 192.168.2.5 | nishi | 2005022000046 | 2005/8/8 14:30 | 14:30 | 0:32 | IMAGE PROCESSING C |
| 5 | 114 | RESERVED | 192.168.2.3 | higashi | 2005022000028 | 2005/8/8 14:24 | 14:30 | 0:02 | SMB TRANSMISSION |
| 5 | 115 | RESERVED | 192.168.2.3 | higashi | 2005022000028 | 2005/8/8 14:24 | 14:30 | 0:02 | FAX |
| | ... | ... | ... | ... | ... | ... | ... | ... | ... |

LICENSE MANAGEMENT APPARATUS CAPABLE OF EFFICIENTLY EXECUTING JOB OR WORKFLOW, LICENSE MANAGEMENT SYSTEM, LICENSE MANAGEMENT METHOD, AND RECORDING MEDIUM

This application is based on Japanese Patent Application No. 2006-020999 filed with the Japan Patent Office on Jan. 30, 2006, the entire content of which is hereby incorporated by reference.

BACKGROUND OF THE INVENTION

1. Field of the Invention

The present invention relates to a license management apparatus, a license management system, a license management method, and a recording medium. More particularly, the present invention relates to a license management apparatus, a license management system, a license management method, and a recording medium, in which license information for each operational function of a plurality of devices is managed.

2. Description of the Related Art

In a system in which a plurality of MFPs (Multi Function Peripherals), a plurality of terminals (for example, PC (Personal Computer) and the like), and servers managing them are connected via a network, the server has a function of managing a workflow. A workflow is formed of a plurality of jobs. A job is executed using, for example, the functions of MFP and PC. When a workflow is issued, a job included in the workflow is executed. A job uses an operational function of each of MFP and PC.

For example, Japanese Laid-Open Patent Publication No. 2003-122537 discloses a technique for managing the number of licenses in such a manner that an operational function of each of MFP and PC can be supplied as a license, and license permission/rejection is decided for an operational function use request from the user so as to use each operational function smoothly.

On the other hand, as disclosed in Japanese Laid-Open Patent Publication No. 2003-323224, the technique of license management includes a technique of floating license in which a license of software operated on PC is shared between PCs connected to a network and is flexibly managed.

In the license management technique disclosed in Japanese Laid-Open Patent Publication No. 2003-122537, however, when the user desires to use a certain operational function (also referred to as function A hereinafter), the corresponding license is used in order according to the order of issuing a job or workflow. Thus, a required license is not always available when necessary, and the execution of job or workflow may be stopped or suspended for a long time, thereby disabling an efficient operation with efficient use of a license.

Moreover, since a license is reserved at a fixed reservation time, the execution time of job or workflow is still fixed even when the license becomes available due to deletion of a job. Accordingly, the job or workflow is not executed even when the license becomes available.

SUMMARY OF THE INVENTION

An object of the present invention is to provide a license management apparatus controlling the order in which a license is granted in order to execute a job or workflow efficiently.

Another object of the present invention is to provide a license management system controlling the order in which a license is granted in order to execute a job or workflow efficiently.

A further object of the present invention is to provide a license management method of controlling the order in which a license is granted in order to execute a job or workflow efficiently.

Yet another object of the present invention is to provide a recording medium having a license management program recorded thereon for controlling the order in which a license is granted in order to execute a job or workflow efficiently.

In accordance with an aspect of the present invention, a license management apparatus includes: a reception unit for receiving a grant request for a license for an operational function to be used, among licenses for each operational function shared by a plurality of devices connected to a network; a determination unit determining whether or not the license for which grant request has been received is available; and a control unit controlling order of grant of the license based on a determination result from the determination unit and grant request information included in the grant request.

Preferably, the determination unit determines whether or not the license for which grant request has been received is available, based on a number of the licenses for each shared operational function and a reservation state of the license for each shared operational function.

Preferably, the control unit controls order of grant of the license for which grant request has been received, by changing a use permission period of the license for which grant request has been received according to a prescribed rule, for a license determined to be unavailable by the determination unit.

Preferably, the grant request information includes a kind of the operational function to be used and a period during which the operational function to be used is used.

Preferably, the license management apparatus further includes a reservation unit making a use reservation for a license determined to be unavailable by the determination unit.

Preferably, when the reception unit has received a grant request for a license for an operational function necessary to execute a workflow including at least one job, if contention occurs and a reservation cannot be made for a license to be used at a time designated by an instruction to execute the workflow, the reservation unit changes the time of reservation for the license for which reservation cannot be made, to a time after a time at which use of the license that has caused contention is ended, and the reservation unit also changes a time of reservation for a license for which no contention occurs and which corresponds to a job included in the workflow, to a time that agrees with an interrelation of an execution timing of the job designated by the instruction to execute the workflow and at which no contention occurs for the license to be used.

Preferably, if a job that uses a reserved license is deleted, the reservation unit changes a reservation time of the reserved license to a time at which no contention for a license to be used occurs and which is earlier than the reservation time of the reserved license.

Preferably, the license management apparatus further includes a notification unit giving a notice of a use permission period of the license for which grant request has been received to a device that has made the grant request for the license.

Preferably, when the reception unit has received a grant request for a plurality of licenses for each operational function used in a workflow including a plurality of jobs, if the determination unit determines that at least one license of the plurality of licenses is unavailable, the control unit changes order of grant of licenses other than at least one license determined to be unavailable among the plurality of licenses.

In accordance with another-aspect of the present invention, a license management system includes a license management apparatus managing a license and a client device in an environment in which the license is shared for each operational function shared by a plurality of devices connected to a network. The client device includes a registration unit for registering a workflow including at least one job, an analysis unit for analyzing an operational function used in the registered workflow, and a transmission unit transmitting a grant request for a license for an operational function necessary to execute the workflow analyzed by the analysis unit. The license management apparatus includes a reception unit for receiving the grant request for a license, a determination unit determining whether or not the license for which grant request has been received is available, and a control unit controlling order of grant of the license based on a determination result from the determination unit and grant request information included in the grant request.

In accordance with a further aspect of the present invention, a license management method includes the steps of: receiving a grant request for a license for an operational function to be used, among licenses for each operational function shared by a plurality of devices connected to a network; determining whether or not the license for which grant request has been received is available; and controlling order of grant of the license based on a determination result at the determining step and grant request information included in the grant request.

Preferably, the determining step determines whether or not the license for which grant request has been received is available, based on a number of licenses for each shared operational function and a reservation state of the license for each shared operational function.

Preferably, the controlling step controls order of grant of the license for which grant request has been received, by changing a use permission period of the license for which grant request has been received according to a prescribed rule, for a license determined to be unavailable at the determining step.

Preferably, the grant request information includes a kind of the operational function to be used and a period during which the operational function to be used is used.

Preferably, the license management method further includes the step of making a use reservation for a license determined to be unavailable at the determining step.

Preferably, when the receiving step has received a grant request for a license for an operational function necessary to execute a workflow including at least one job, if contention occurs and a reservation cannot be made for a license to be used at a time designated by an instruction to execute the workflow, the step of making a use reservation includes the step of changing the time of reservation for the license for which reservation cannot be made, to a time after a time at which use of the license that has caused contention is ended, and also changing a time of reservation of a license for which no contention occurs and which corresponds to a job included in the workflow to a time that agrees with an interrelation of an execution timing of the job designated by the instruction to execute the workflow and at which no contention occurs for the license to be used.

Preferably, if a job that uses a reserved license is deleted, the step of making a use reservation includes the step of changing a reservation time of the reserved license to a time at which no contention for a license to be used occurs and which is earlier than the reservation time of the reserved license.

Preferably, the license management method further includes the step of giving a notice of a use permission period of the license for which grant request has been received to a device that has made the grant request for the license.

Preferably, when the step of receiving a grant request has received a grant request for a plurality of licenses for each operational function used in a workflow including a plurality of jobs, if it is determined at the determining step that at least one license of the plurality of licenses is unavailable, the controlling step changes order of grant of licenses other than at least one license determined to be unavailable among the plurality of licenses.

In accordance with yet another aspect of the present invention, a recording medium has a license management program recorded thereon to be executed by a computer. The license management program includes the steps of: receiving a grant request for a license for an operational function to be used, among licenses for each operational function shared by a plurality of devices connected to a network; determining whether or not the license for which grant request has been received is available; and controlling order of grant of the license based on a determination result at the determining step and grant request information included in the grant request.

Therefore, the present invention has an effect that a job or a workflow is executed efficiently.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A and FIG. 3B show a license number management table by way of example.

FIG. 9 shows a license use management table by way of example.

FIG. 11A and FIG. 11B illustrate data communicated between a client device and a license management apparatus.

FIG. 20 shows a license use management table by way of example.

DESCRIPTION OF THE PREFERRED EMBODIMENTS

Figure 1:
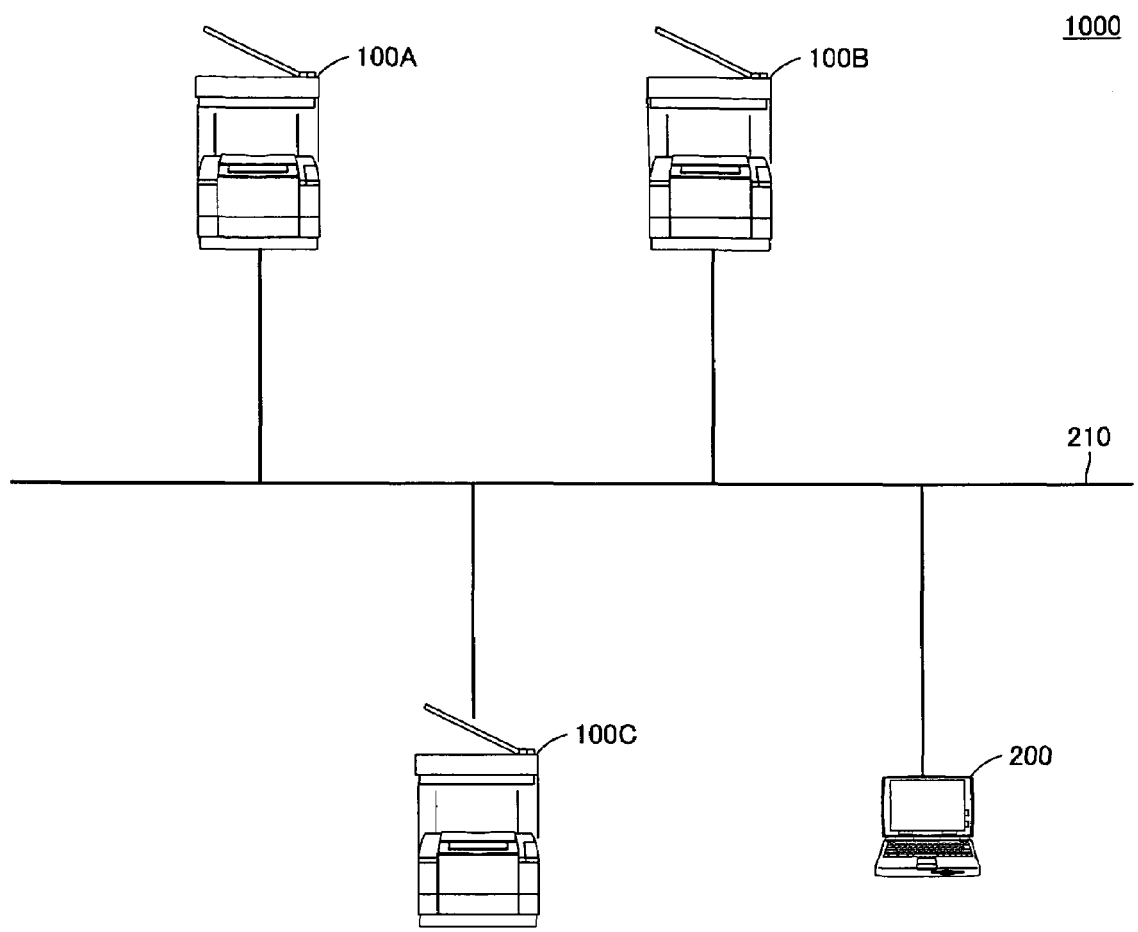
FIG. 1 is a block diagram showing a configuration of a license management system in an embodiment of the present invention.

In the following, an embodiment of the present invention will be described with reference to the figures. In the following description, the same parts will be denoted with the same reference characters. Their designations and functions are also the same. Therefore, the detailed description thereof will not be repeated.

FIG. 1 is a block diagram showing a configuration of a license management system 1000 in the present embodiment. Referring to FIG. 1, license management system 1000 includes MFP 100A, 100B, 100C, a PC 200, and a network 210.

Network 210 is, for example, a LAN.

Each of MFP 100A, 100B, 100C is connected to network 210. In the following, MFP 100A, 100B, 100C may also be referred to as MFP 100 collectively. MFP 100 has a plurality of functions including a facsimile, copier, printer, scanner, and the like. In other words, MFP 100 operates as an image forming apparatus. PC 200 is connected to network 210.

Figure 2:
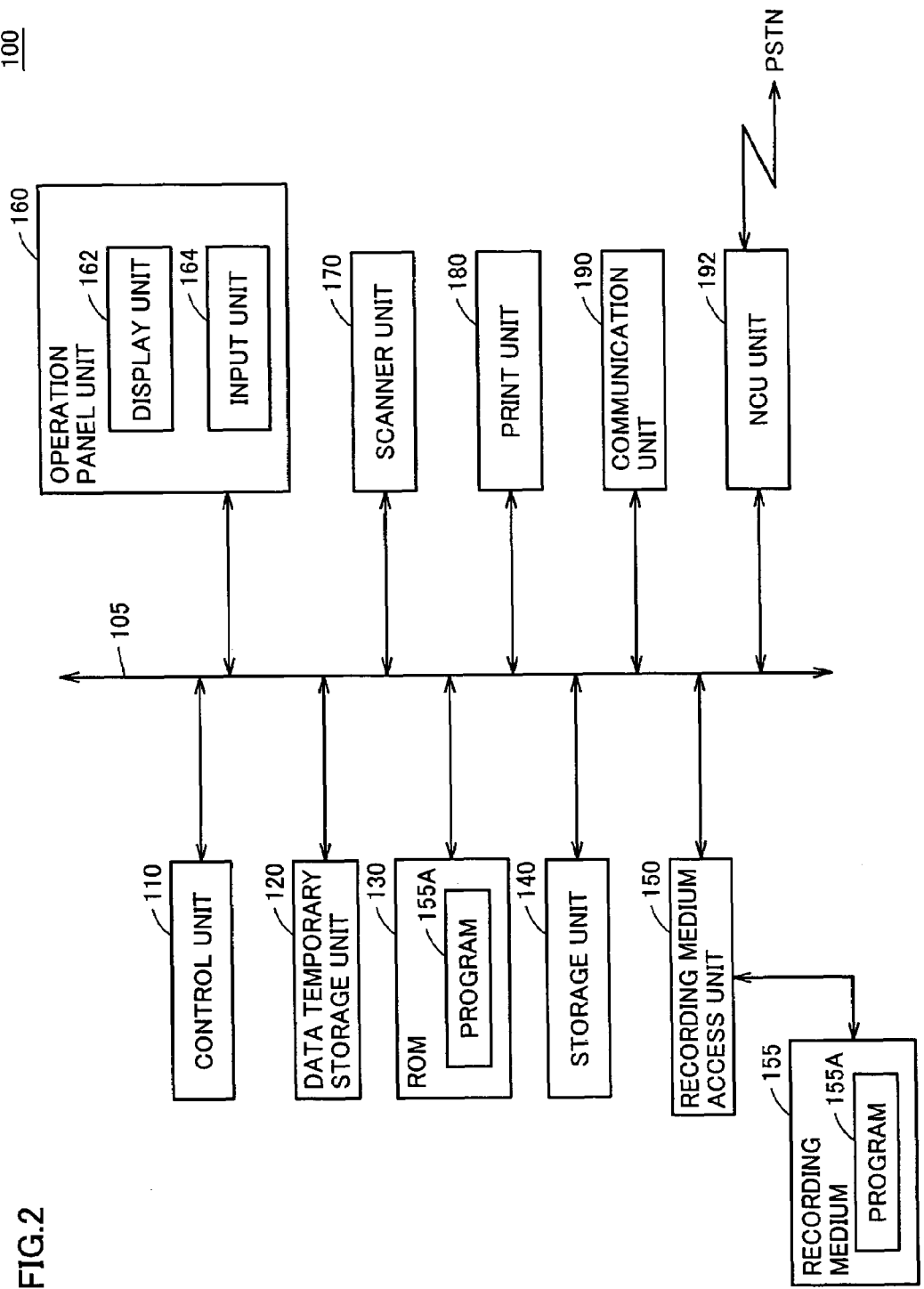
FIG. 2 is a block diagram showing an internal configuration of MFP.

FIG. 2 is a block diagram showing an internal configuration of MFP 100. It is noted that FIG. 2 also shows a recording medium 155 for the sake of illustration. Recording medium 155 has a license management program 155A recorded thereon as described later. License management program 155A is recorded in a medium or the like and distributed as a program product.

Referring to FIG. 2, MFP 100 includes a data bus 105, a control unit 110, a data temporary storage unit 120, a ROM (Read Only Memory) 130, a storage unit 140, and a recording medium access unit 150.

Control unit 110, data temporary storage unit 120, ROM 130, storage unit 140, and recording medium access unit 150 are connected to data bus 105.

ROM 130 stores license management program 155A for causing control unit 110 to perform the processes described later, a variety of other programs, data, and the like.

Data temporary storage unit 120 has data accessed by control unit 110 and is used as a work memory temporarily storing data. Data temporary storage unit 120 may be any of a RAM (Random Access Memory) capable of temporally storing data, SRAM (Static Random Access Memory), DRAM (Dynamic Random Access Memory), SDRAM (Synchronous DRAM), DDR-SDRAM (Double Data Rate SDRAM) having a high-speed data transfer function called a double data rate mode, RDRAM (Rambus Dynamic Random Access Memory) that is a DRAM employing a high-speed interface technique developed by Rambus Inc., Direct-RDRAM (Direct Rambus Dynamic Random Access Memory), and any other circuit configured to store and hold data in a volatile manner.

Storage unit 140 is a hard disk capable of storing a large amount of data. It is noted that storage unit 140 is not limited to a had disk and may be a circuit (for example, a flash memory) as long as it is configured to be able to store and hold data in a nonvolatile manner without power supply.

Control unit 110 has a function of performing a variety of processes and operations for each unit in MFP 100 according to license management program 155A stored in ROM 130 or storage unit 140. Control unit 110 may be any of a microprocessor, FPGA (Field Programmable Gate Array) that is a programmable LSI (Large Scale Integration), ASIC (Application Specific Integrated Circuit) designed and manufactured for a specific application, and any other circuit having an operation function.

Recording medium access unit 150 has a function of reading license management program 155A from recording medium 155 having license management program 155A recorded thereon. License management program 155A stored in recording medium 155 is read from recording medium access unit 150 and stored in storage unit 140 through an operation (an installation process) of control unit 110.

The program for the installation process is stored in storage unit 140 beforehand, and the installation process is performed by control unit 110 based on the program for the installation process.

It is noted that license management program 155A may not be stored in ROM 130 and license management program 155A may not be installed in storage unit 140. In this case, control unit 110 reads license management program 155A stored in recording medium 155 through recording medium access unit 150 to perform a prescribed process based on license management program 155A.

Recording medium 155 may be any of DVD-ROM (Digital Versatile Disk Read Only Memory), CD-ROM (Compact Disk Read Only Memory), MO (Magneto Optical Disk), a floppy (R), a disk, a CF (Compact Flash) card, SM (Smart Media (R)), MMC (Multi Media Card), an SD (Secure Digital) memory card, a memory stick (R), xD picture card and USB memory, a magnetic tape, and other nonvolatile memories.

MFP 100 further includes an operation panel unit 160. Operation panel unit 160 is connected to data bus 105.

Operation panel unit 160 has a display unit 162 and an input unit 164.

Display unit 162 has a function of presenting a variety of information in characters, images, or the like to the user. Display unit 162 has a touch panel function that allows the user to directly touch the screen to input information. Display unit 162 may be any of a liquid crystal display (LCD), FED (Field Emission Display), Organic EL (Electro Luminescence) display, and other display devices in dot matrix or other image display schemes.

An image appearing on display unit 162 may include a button image. When the user performs a press operation on the button image, the information of the pressed button image (referred to as the pressed button information hereinafter) is transmitted to control unit 110.

Input unit 164 is an interface for the user to operate MFP 100. Input unit 164 is provided, for example, with a plurality of buttons. The plurality of buttons include a power button for turning on or off the power of MFP 100. When MFP 100 is powered on and then the user presses the power button, operation panel unit 160 transmits a power-off instruction to control unit 110 to turn off the power.

MFP 100 further includes a scanner unit 170, a printing unit 180, a communication unit 190, and an NCU unit 192. Scanner unit 170, printing unit 180, communication unit 190, and NCU unit 192 are connected to data bus 105.

Scanner unit 170 has a function of reading an image from a medium such as paper.

Printing unit 180 has a function of printing a designated image or character on a medium such as paper for printout.

Communication unit 190 communicates data with network 210. Communication unit 190 is a communication interface using Ethernet (R). Alternatively, communication unit 190 may be any of USB (Universal Serial Bus) 1.1, USB 2.0, and other communication interfaces for serial transmission. Alternatively, communication unit 190 may be a communication interface that performs data communications using any of IEEE802.11a, IEEE802.11b, IEEE802.11g, which are standards for wireless LAN, or other wireless techniques.

NCU unit 192 has a function of performing fax transmissions using a public switched telephone network (PSTN).

Referring to FIG. 1 again, license management system 1000 in the present embodiment is configured with one device having a server function and a plurality of client devices.

The device having a server function manages information of a plurality of equipment connected to network 210. If the device having a server function manages, for example, license information, the device having a server function serves as a license management apparatus. The device having a server function is, for example, MFP 100A. The client device are, for example, MFP 100B, 100C and PC 200.

Storage unit 140 of the device having a server function stores a license number management table that manages the number of licenses for each function of facsimile, copier, printer, and scanner, for each of a file transmission function, an image processing function, a file format conversion function, and an OCR function, which are held by the device having a server function and the client devices. The file transmission function is a function of transmitting data. The image processing function is a function of performing an editing process, a processing process, and a conversion process on an image. The file format conversion function is a function of converting a format of a file. The OCR function is a function of recognizing characters and the like.

It is noted that in the following, a license refers to the right to use software installed in PC or MFP connected to a network and the right to use the functions of a facsimile, copier, printer, scanner, and the like, a file transmission function, an image processing function, a file format conversion function, and an OCR function.

FIGS. 3A and 3B show a license number management table T200 by way of example. In FIGS. 3A and 3B, a "function name" in license number management table T200 is the designation of a function. A "license number" in license number management table T200 indicates the total number of licenses for a function in a corresponding row. Here, the total number of licenses is the number of licenses that can be shared and used by a plurality of equipment connected to network 210. It is noted that a scan function and a print function are basic functions of MFP.

Now, the processes in the client device and the license management apparatus in the present embodiment will be described. In the following, the process in the client device in the present embodiment is also referred to as a client device process A. On the other hand, in the following, the process in the license management apparatus in the present embodiment is also referred to as a management apparatus process A.

Figures 4, 5:
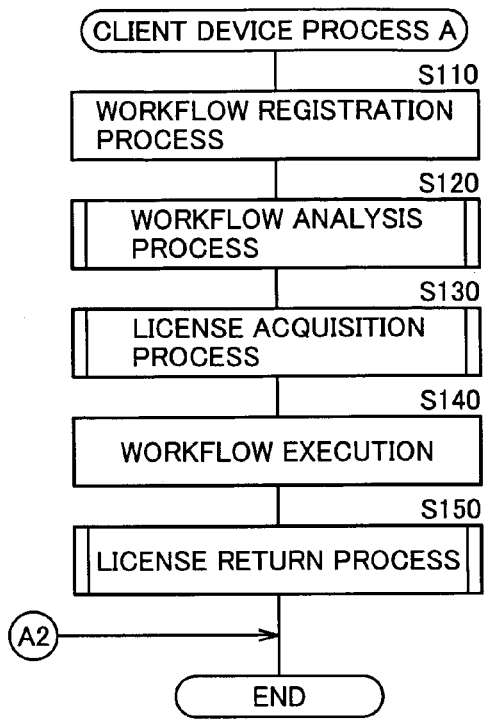
FIG. 4 is a flowchart of a client device process A.
FIG. 5 illustrates exemplary license grant request information.

FIG. 4 is a flowchart of the client device process A. Here, a workflow formed of a plurality of jobs will be described. However, the present embodiment is not limited to a workflow, and a similar process as described below may also be performed on one job. In FIG. 4, at step S10, a workflow registration process is performed. In the workflow registration process, control unit 110 causes data temporary storage unit 120 to store (register) a workflow based on a press operation on input unit 164 or display unit 162 by the user. Thereafter, the process proceeds to step S120.

At step S120, a workflow analysis process is performed. The workflow analysis process is a process of creating license grant request information for requesting a grant of a required license from the license management apparatus based on the workflow (referred to as workflow A) registered at step S110.

FIG. 5 shows exemplary license grant request information D100. In FIG. 5, the "starting time of use" in license grant request information refers to a time at which a corresponding workflow is started. The "duration of use" refers to a period of time during which a corresponding function is used. The numerals are expressed in minutes.

Figure 6:
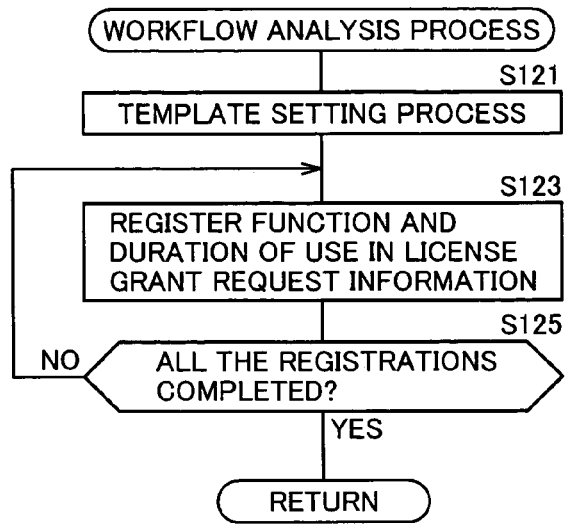
FIG. 6 is a flowchart of a workflow analysis process.

FIG. 6 is a flowchart of the workflow analysis process corresponding to step S120 in FIG. 4. In FIG. 6, at step S121, a template setting process is performed. In the template setting process, control unit 110 sets "data kind", "user name", "workflow number", "starting time of use" in license grant request information D100 in FIG. 5 described above, based on the data stored in data temporary storage unit 120. In the template setting process, the content is set for a predetermined item. Thereafter, the process proceeds to step S123.

At step S123, a workflow function registering process is performed. In the workflow function registering process, control unit 110 registers functions in the order of execution of workflows based on workflow data input by the user that is stored in data temporary storage unit 120. Specifically, control unit 110 registers a function to be used and a duration of use for the function in the license grant request information. In other words, in the workflow function registering process, control unit 110 registers the functions to be used in all the processes included in a workflow in order. It is noted that the number of functions to be registered varies from workflow to workflow. Thereafter, the process proceeds to step S125.

At step S125, control unit 110 determines whether or not the registration is completed for all the functions to be performed in a workflow. If YES at step S125, the workflow analysis process ends, and the process returns to the client device process A in FIG. 4 and goes to step S130 subsequent to step S120. In other words, when all the functions to be performed in a workflow have been registered in the license grant request information, the generation of the license grant request information is completed in the workflow analysis process. In the following, the license grant request information is also referred to as grant request information including an attribute of a grant request.

On the other hand, if NO at step S125, the process at step S123 is performed again. If it is determined as NO at step S125, there is a function that has not been registered in the license grant request information.

Referring to FIG. 4 again, upon the end of the process at step S120, the process proceeds to step S130.

At step S130, a license acquisition process is performed.

Figure 7:
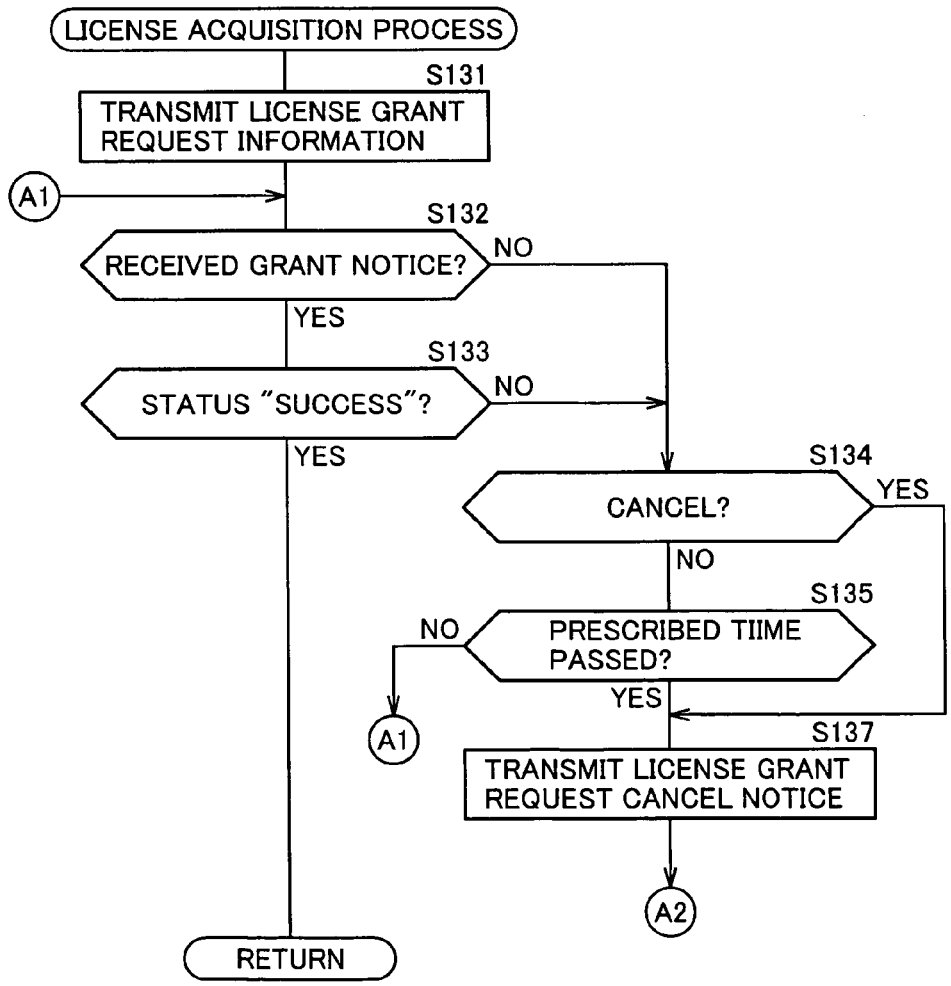
FIG. 7 is a flowchart of a license acquisition process.

FIG. 7 is a flowchart of the license acquisition process. In FIG. 7, at step S131, control unit 110 transmits to the license management apparatus the license grant request information generated at step S120.

In the license management apparatus, the following processes (also referred to as a management apparatus process A hereinafter) are performed.

Figure 8:
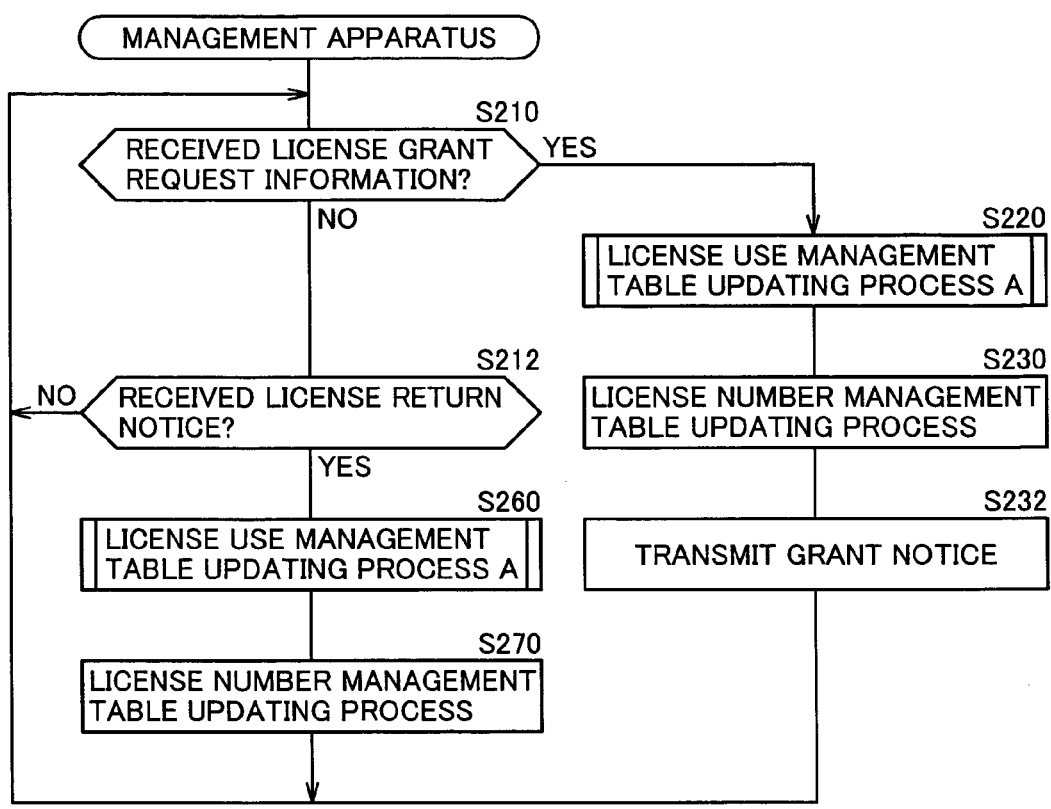
FIG. 8 is a flow chart of a management apparatus process A.

FIG. 8 is a flowchart of the management apparatus process A. In FIG. 8, at step S210, control unit 110 determines whether or not the license grant request information has been received. If YES at step S210, the process proceeds to step S220. On the other hand, if NO at step S210, the process proceeds to step S212 described later. Assuming that it is determined that the license management apparatus has received the license grant request information, the process proceeds to step S220.

At step S220, a license use management table updating process A is performed.

FIG. 9 shows a license use management table T300 by way of example. The license use management table is a table formed of reservation data of a plurality of licenses based on a plurality of license grant request information. The license use management table T300 is stored in data temporary storage unit 120 of the license management apparatus.

In FIG. 9, a "number" refers to a management number of license reservation data. In the column of "status", the license reservation data represented as "reserved" indicates the status in which a reservation is made to use a corresponding license. In the column of "status", the license reservation data represented as "granted" indicates that the present time is to be a starting time of using a license corresponding to license reservation data as "reserved" and the corresponding license is now being granted.

"Priority" refers to the order of priority in which a license is granted, among a plurality of license reservation data set as "reserved". As the license reservation data has a smaller value of priority, the corresponding license becomes available sooner.

The numerals in the column of "registerer" in the registration information indicates an IP address of equipment that has registered license reservation data. "User", "workflow number" is data included in license grant request information. "Registration date and time" indicates the date and time on which license reservation data is registered. "Start" refers to the time at which a corresponding license starts to be used. "Duration" refers to a period of time during which a corresponding license is used. The numerals are expressed in minutes. The information in the column corresponding to "start" and the information corresponding to the column of "duration" in license use management table T300 are updated based on license grant request information D100.

For example, the license reservation data with management number "106" is data indicating that the license for the scan function is used for five minutes from 14:30. It is also indicated that the license for the scan function is now reserved.

Figure 10:
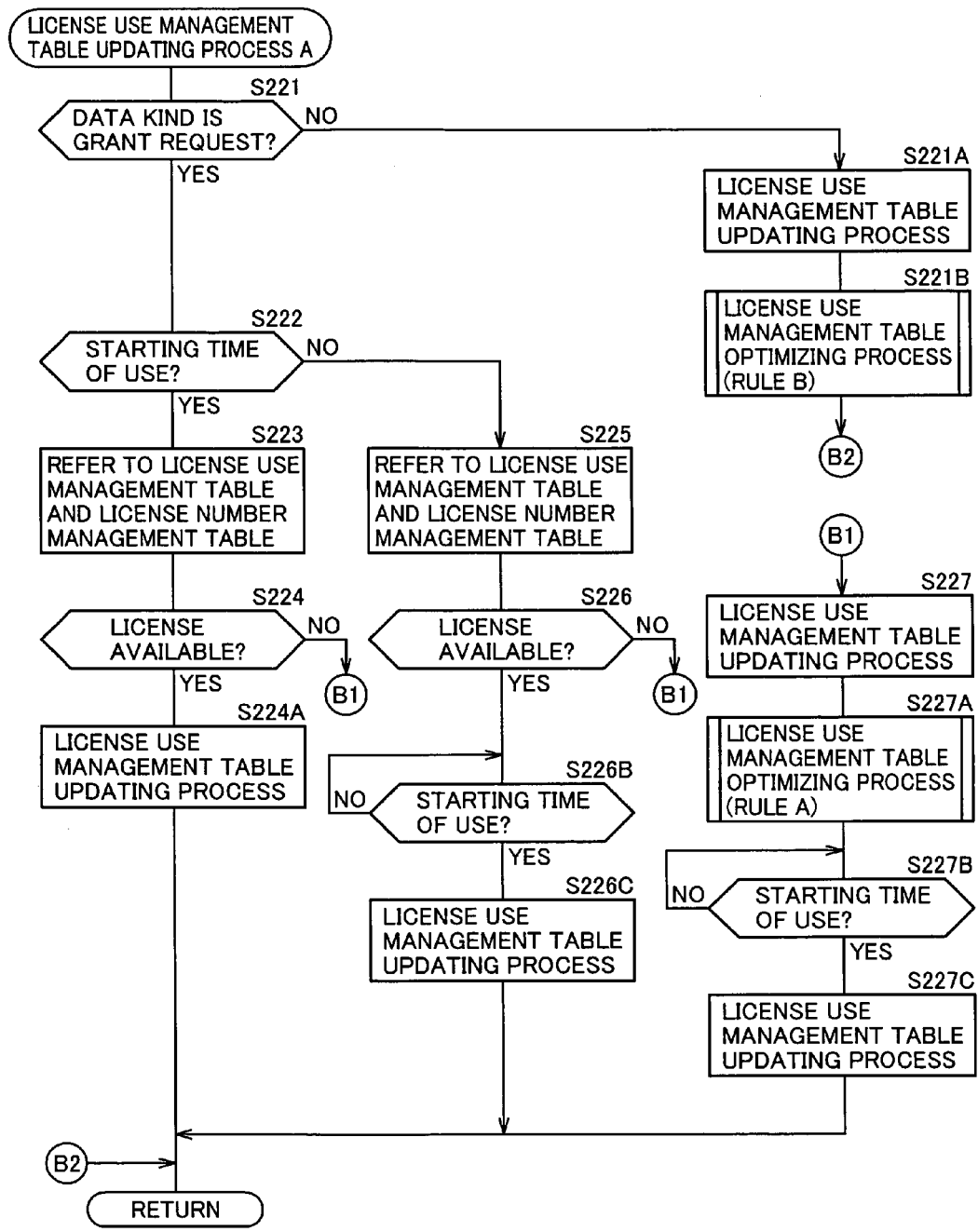
FIG. 10 is a flowchart of a license use management table updating process A.

FIG. 10 is a flowchart of the license use management table updating process A. In FIG. 10, at step S221, control unit 110 determines whether or not the kind of the received data is a grant request. If YES at step S221, the process proceeds to step S222. On the other hand, if NO at step S221, the process proceeds to step S221A described later.

At step S222, control unit 110 determines whether or not the present time is after "starting time of use" of the received data. If YES at step S222, the process proceeds to step S223. On the other hand, if NO at step S222, the process proceeds to step S225. For example, assume that the present time is 14:25 and "starting time of use" is 14:24 or 14:25. In this case, the process proceeds to step S223.

At step S223, the license use management table and the license number management table are referred to. The license use management table is stored in storage unit 140. Specifically, control unit 110 refers to the license use management table and the license number management table.

After the process at step S223, the process proceeds to step S224.

At step S224, control unit 110 determines whether or not all the licenses that are requested to be granted by the license grant request information are available. The determination is made as follows.

For example, assume that the time at which the process at step S224 is performed is 14:25. It is also assumed that a license for a function that is requested to be granted is the license for "scan" function. In the following, a license for a function that is requested to be granted is also referred to as a grant-requested license. In addition, assume that the starting time of use for the grant-requested license is 14:25 and the duration of use is seven minutes. In other words, a license grant request is made for "scan" function from 14:25 to 14:32.

In this case, based on the information indicated in the license reservation data with the management numbers "103", "106" and "108" in the license use management table T300, one license is now granted and two licenses are now reserved for "scan" function, and the starting time of use of the license is 14:30. Therefore, control unit 110 determines that the above-noted grant-requested license cannot be used since the times of use overlap.

If it is determined that the times of use overlap, control unit 110 determines whether or not there is any available grant-requested license based on the license number management table that has been referred to at step S223. Even when n grant-requested licenses have the overlapping time of use and are not available, if there are n or more grant-requested licenses in the overlapping duration of use, control unit 110 determines that the grant-requested license is available. It is noted that control unit 110 determines that the grant-requested license is not available when the times of use overlap among n grant-requested licenses and the number of overlapping grant-requested licenses is less than n in the overlapping duration of use.

It is noted that in the determination described above, if the times of use of the grant-requested license do not overlap, control unit 110 determines whether or not the grant-requested license is available, depending on whether or not there is any grant-requested license, based on the license number management table referred to at step S223.

Control unit 110 determines whether or not all the grant-requested licenses are available by performing the processes described above on all the licenses that are requested to be granted by the license grant request information.

If YES at step S224, the process proceeds to step S224A. On the other hand, if NO at step S224, the process proceeds to step S227. Assume that control unit 110 determines that all the licenses are available. In this case, the process proceeds to step S224A.

At step S224A, a license use management table updating process is performed. In the license use management table updating process, control unit 110 adds license reservation data corresponding to each of all the grant-requested licenses to the license use management table T300, thereby performing a process of updating license use management table T300. It is noted that in this case "status" of the added license reservation data is "granted". Thereafter, the license use management table updating process A ends, and the process returns to the management apparatus process A in FIG. 8 and proceeds to step S230 subsequent to step S220.

At step S230, a license number management table updating process is performed. In the license number management table updating process, the number of licenses in the license number management table stored in storage unit 140 is changed based on all the licenses that are requested to be granted by the license grant request information. For example, assume that the license number management table is license number management table T200 and the license grant request information is license grant request information D100.

In this case, license grant request information D100 is set such that one license is to be used for each of the scan function, the transmission function, and the image processing function. Therefore, control unit 110 performs a subtraction from the corresponding license number in license number management table T200, thereby updating license number management table T200 to a license number management table T200A.

FIG. 3B shows license number management table T200A.

Referring to FIG. 8 again, after the process at step S230, the process proceeds to step S232.

At step S232, control unit 110 transmits a grant notice with a status indicating "success" to a client device that has transmitted the license grant request information. Here, a grant notice refers to a notice indicating whether or not a license corresponding to a requested function can be granted. Thereafter, the process at step S210 is performed again.

FIGS. 11A and 11B show data communicated between the client device and the license management apparatus. FIG. 11A shows a grant notice D120 by way of example. Information that specifies the function for which license is granted (for example, a scan function, a transmission function, an image processing function) is included in grant notice D120. A grant management number is a number for managing each function for which license is granted.

It is assumed that the grant notice transmitted at step S232 is grant notice D120.

Referring to FIG. 7 again, in the client device, after the process at step S131, the process proceeds to step S132.

At step S132, control unit 110 determines whether or not the grant notice corresponding to the license grant request information transmitted at step S131 has been received. If YES at step S132, the process proceeds to step S133. On the other hand, if NO at step S132, the process proceeds to step S134 described later.

At step S133, control unit 110 determines whether or not the status of the received grant notice is "success". If YES at step S133, the license acquisition process ends, and the process returns to the client device process A in FIG. 4 and proceeds to step S140 subsequent to step S130. On the other hand, if NO at step S133, the process proceeds to step S134 described later.

Referring to FIG. 4 again, in the client device, after the process at step S130, the process proceeds to step S140.

At step S140, the workflow registered at step S110 is executed. Upon the completion of the execution of the workflow, the process proceeds to step S150.

At step S150, a license return process is performed.

Figure 12:
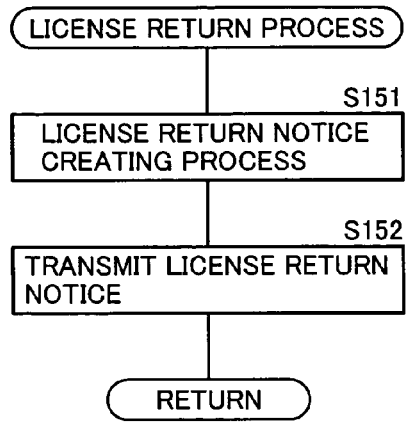
FIG. 12 is a flowchart of a license return process.

FIG. 12 is a flowchart of the license return process. Referring to FIG. 12, at step S151, a license return notice creating process is performed. In the license return notice creating process, a license return notice is created. A license return notice refers to a notice for returning the license used in the workflow executed at step S140. Control unit 110 creates a license return notice based on the license used in the workflow executed at step S140.

FIG. 11B shows a license return notice D140A by way of example. "Data kind" of license return notice D140A is a return notice. License return notice D140A also includes information that specifies a function (for example, a scan function, a transmission function, an image processing function) for which license is to be returned. A return management number is a number for managing each function for which license is returned. It is noted that each return management number in license return notice D140A is the same number as each grant management number in grant notice D120. In the following, a license to be returned is also referred to as a return license.

Referring to FIG. 12 again, upon the end of the process at step S151, the process proceeds to step S152.

At step S152, control unit 110 transmits the created license return notice to the license management apparatus. Thereafter, the license return process ends, and the process returns to the client device process A in FIG. 4. Then, the client device process A also ends.

Referring to FIG. 8 again, in the license management apparatus, the process at step S210 described above is performed. It is determined that the license management apparatus has received the license return notice, and then the process proceeds to step S212.

At step S212, control unit 110 determines whether or not the license return notice has been received. If YES at step S212, the process proceeds to step S260. On the other hand, if NO at step S212, the process at step S210 is performed again. In this case, it is determined that the license management apparatus has received the license return notice, and then the process proceeds to step S260.

At step S260, the license use management table updating process A in FIG. 10 as described above is performed.

Referring to FIG. 10 again, in the license management apparatus, the process at step S221 as described above is performed. In this case, the kind of the received data is not "grant request", and therefore the process proceeds to step S221A. It is assumed that at step S221, the kind of data received by the license management apparatus is "grant request" or "return notice". Therefore, when the process proceeds to step S221A, the kind of the received data is "return notice".

At step S221A, a license use management table updating process is performed. In the license use management table updating process, control unit 110 updates the license use management table T300 based on the above-noted return license indicated by the received license return notice. Specifically, control unit 110 deletes the license reservation data or grant data corresponding to the return license, thereby performing a process of updating the license use management table T300. Thereafter, the process proceeds to step S221B.

At step S221B, a license use management table optimizing process is performed according to rule B. Through the license use management table optimizing process, the order in which a license is granted is controlled. It is noted that the license use management table optimizing process that is performed according to rule B will be described in detail later. It is noted that at step S221B, the license use management table optimizing process may be performed according to rule A described later. Upon the end of the license use management table optimizing process, the license use management table updating process A ends, and the process returns to the management apparatus process A in FIG. 8 and proceeds to step S270 subsequent to step S260.

Referring to FIG. 8 again, at step S270, a license number management table updating process is performed. In the license number management table updating process, the number of licenses in the license number management table stored in storage unit 140 is changed based on the return license. For example, assume that the return licenses are licenses for "scan function" and "print function". In this case, control unit 110 performs an addition to the corresponding license number in the license number management table, thereby updating the license number management table. Thereafter, the process at step S210 is performed again.

Referring to FIG. 10 again, in the process at step S222, it is assumed that the present time is 12:25 and "starting time of use" is 12:30. In this case, the process proceeds to step S225.

At step S225, a process similar to step S223 as described above is performed and therefore the detailed description will not be repeated. Thereafter, the process proceeds to step S226.

At step S226, a process similar to step S224 is performed and therefore the detailed description thereof will not be repeated. If YES at step S226, the process proceeds to step S226A. On the other hand, if NO at step S226, the process proceeds to step S227. Assume that control unit 110 determines that all the licenses are available. In this case, the process proceeds to step S226B.

At step S226B, a process similar to step S222 as described above is performed and therefore the detailed description thereof will not be repeated. If YES at step S226B, the process proceeds to step S226C. If NO at step S226B, the process at step S226B is repeated again.

At step S226C, a process similar to step S224A as described above is performed and therefore the detailed description thereof will not be repeated. Thereafter, the license use management table updating process A ends, and the process returns to the management apparatus process A in FIG. 8 and proceeds to step S230 subsequent to step S220.

It is assumed that in the process at step S224 or step S226, control unit 110 determines that all or part of the grant-requested licenses are unavailable. In this case, the process proceeds to step S227.

At step S227, a license use management table updating process is performed. In the license use management table updating process, control unit 110 adds, to the license use management table T300, license reservation data corresponding to each of all the grant-requested licenses that are determined to be unavailable, thereby performing a process of updating the license use management table T300. It is noted that in this case, the "status" of the added license reservation data is "reserved". Thereafter, the process proceeds to step S227A.

At step S227A, a license use management table optimizing process is performed according to rule A described later. It is noted that at step S227A, a license use management table optimizing process may be performed according to rule B described later. Alternatively, at step S227A, a license use management table optimizing process may be performed according to rule C described later. In the license use management table optimizing process, control unit 110 performs a process according to the reservation state of jobs based on a plurality of license reservation data.

Figure 13A:
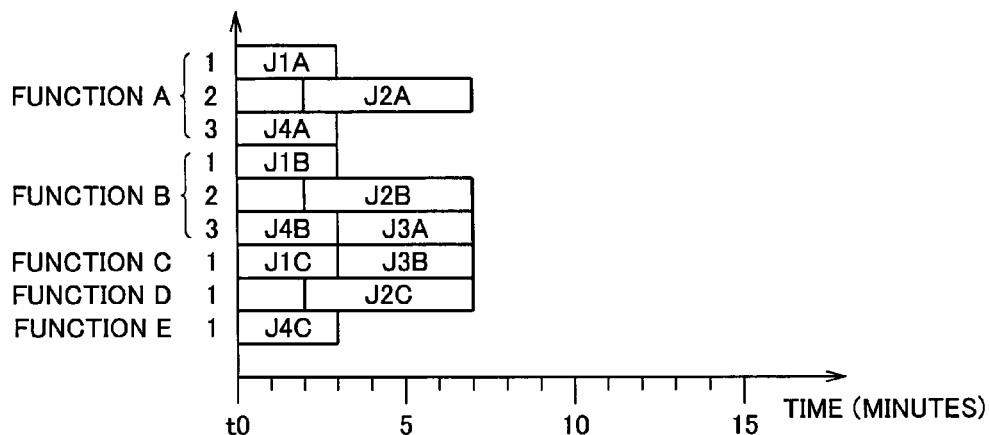
FIG. 13A and FIG. 13B illustrate the reservation state of jobs based on a plurality of license reservation data.
Figure 13B:
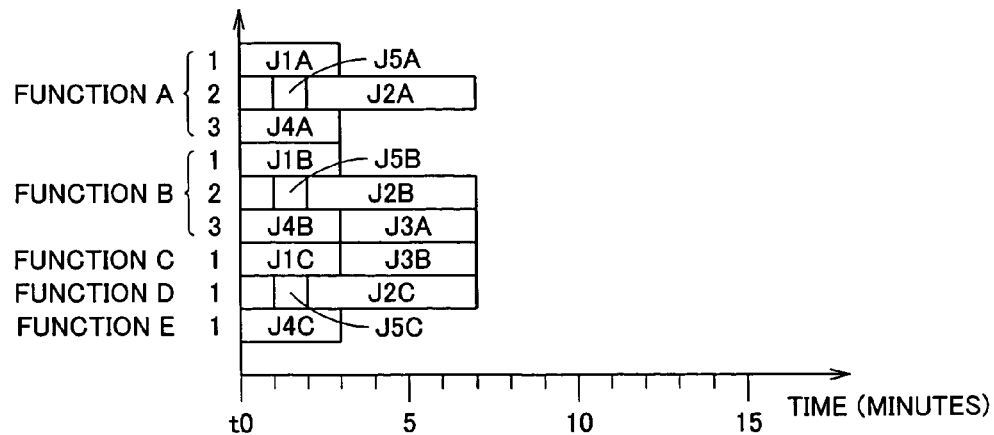

FIGS. 13A and 13B show the reservation state of jobs based on a plurality of license reservation data. FIG. 13A shows the reservation state of jobs based on license reservation data in which no contention occurs for the license to be used. In this case, control unit 110 does not perform a process of optimizing the license use management table T300.

In FIG. 13A, functions A, B, C, D, E are, for example, a scan function, a print function, a transmission function, an image processing function, and a file format conversion function, respectively. In FIG. 13A, the horizontal axis represents the elapsed time after time t0, which is expressed in minutes, for example. It is noted that the number of licenses for each of function A and function B is three, by way of example. Furthermore, the number of license for each of functions C, D, E is one, by way of example.

Referring to FIG. 13A, jobs J1A, J1B, J1C constitute a workflow 1. Jobs J2A, J2B, J2C constitute a workflow 2. Jobs J3A, J3B constitute a workflow 3. Jobs J4A, J4B, J4C constitute a workflow 4.

Jobs J1A, J1B, J1C use function A, function B, and function C, respectively, for three minutes from time t0. Jobs J2A, J2B, J2C use function A, function B, and function D, respectively, for five minutes from the time two minutes after time t0. Jobs J3A, J3B use function B and function C, respectively, for four minutes from the time three minutes after time t0. Jobs J4A, J4B, J4C use function A, function B, and function E, respectively, for three minutes from time t0. Contention for a license to be used occurs when there exists a job that has already been reserved at at least one of the starting times of all the jobs that constitute one workflow.

FIG. 13B shows the reservation state of jobs based on the license reservation data in which no contention occurs for the license to be used. In this case, control unit 110 does not perform a process of optimizing the license use management table T300. FIG. 13B differs from FIG. 13A in that a workflow 5 formed of jobs J5A, J5B, J5C is additionally reserved. Except for this point, FIG. 13B is similar to FIG. 13A and therefore the detailed description will not be repeated. Jobs J5A, J5B, J5C use function A, function B, and function D, respectively, for one minute from the time one minute after time t0. The reservation of each job is set at the earliest time during the time in which a license is available. In other words, the reservation time of each job is set at the earliest time at which license contention does not occur.

In FIG. 13B, workflow 5 (jobs J5A, J5B, J5C) is reserved later than workflow 4 (jobs J4A, J4B, J4C). In the state of FIG. 13B, although workflow 5 is reserved later than workflow 4, no contention occurs for the license to be used.

Figure 14A:
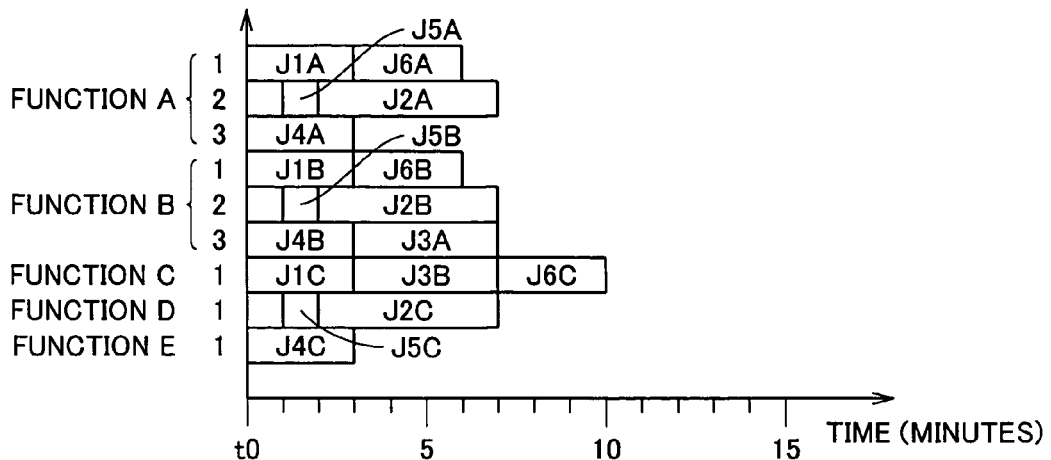
FIG. 14A, FIG. 14B, and FIG. 14C illustrate the reservation state of jobs based on a plurality of license reservation data.
Figure 14B:
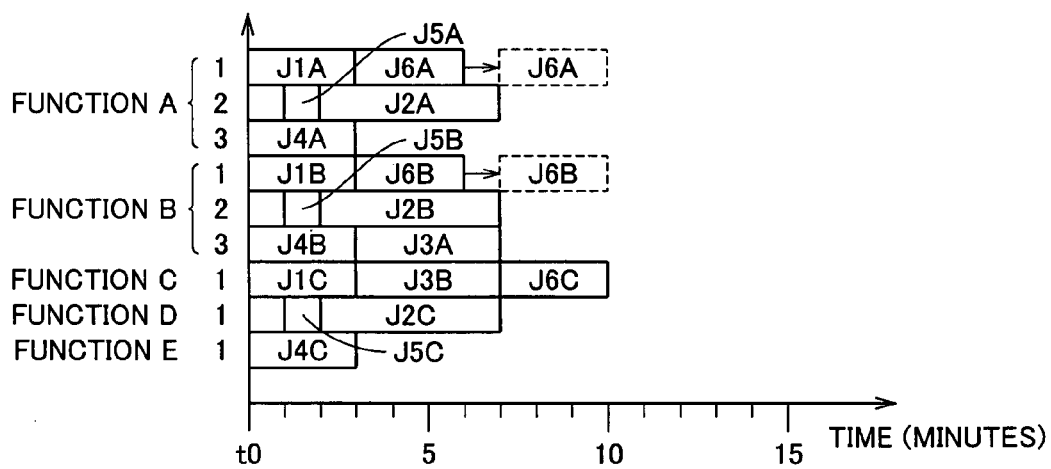
Figure 14C:
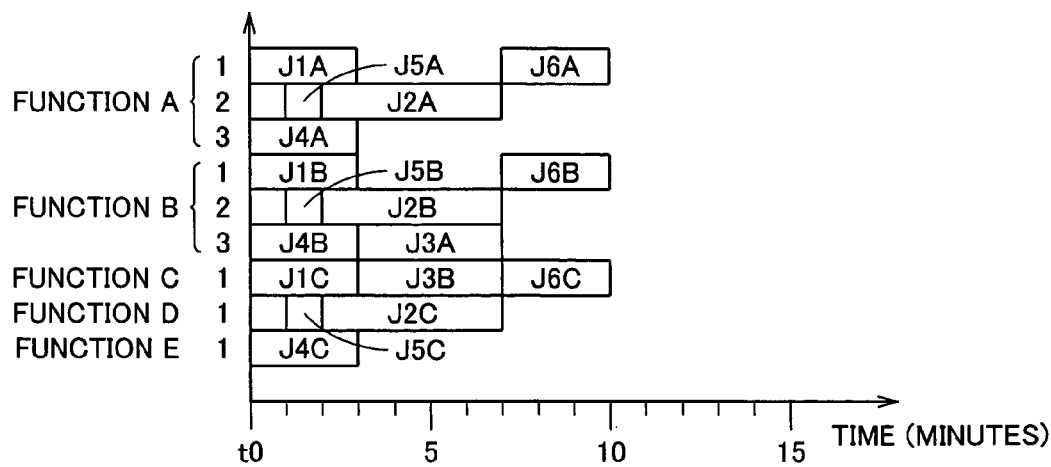

FIGS. 14A, 14B and 14C show the reservation state of jobs based on a plurality of license reservation data. FIG. 14A shows the reservation state of jobs based on the license reservation data, in which contention for the license to be used occurs. FIG. 14A differs from FIG. 13B in that a workflow 6 formed of jobs J6A, J6B, J6C is additionally reserved. Except for this point, FIG. 14A is similar to FIG. 13B and therefore the detailed description will not be repeated.

In a workflow execution instruction, first, jobs J6A, J6B, J6C use function A, function B, and function C, respectively, for three minutes from the time three minutes after time t0. The reservation of each job is set at the earliest time during the time in which a license is available, so that jobs J6A, J6B are reserved at the respective positions shown in FIG. 14A.

Jobs J6A, J6B, J6C must be started at the same time in order that jobs J6A, J6B, J6C agree with the workflow execution instruction. However, in FIG. 14A, job J3B has already been reserved at the starting time of job J6C. Since contention for the license to be used occurs, the reservation time of job J6C is set at the time when job J3B is ended.

If the reservation state of jobs based on a plurality of license reservation data is as shown in FIG. 14A, control unit 110 performs a license use management table optimizing process according to the following rule A. According to rule A, the time when one or more jobs performed in one workflow are reserved is changed to the time that agrees with the interrelation among the job execution timings designated by the workflow execution instruction and at which no contention occurs for the license to be used. In the following, the time at which a job is reserved is also referred to as a job reservation time. Furthermore, in the following, a workflow of which job reservation time before the license use management table optimizing process corresponding to each of a plurality of jobs included in the workflow does not agree with the workflow execution instruction is also referred to as an execution instruction disagreement workflow. The execution instruction disagreement workflow is, for example, workflow 6.

Figure 17:
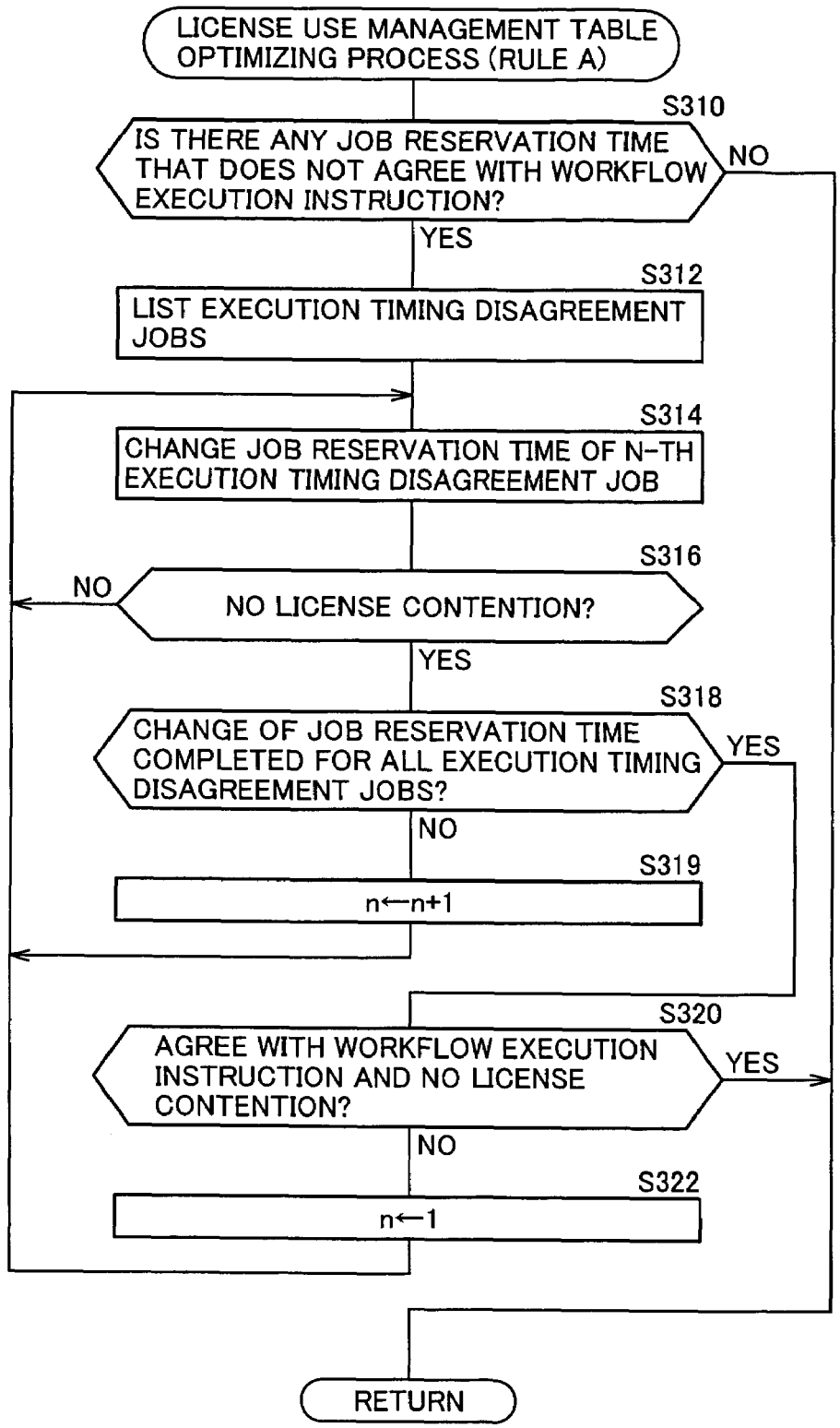
FIG. 17 is a flowchart of a license use management table optimizing process performed according to rule A.

FIG. 17 is a flowchart of the license use management table optimizing process performed according to rule A. Referring to FIG. 17, at step S310, control unit 110 determines whether or not there is any reservation time that does not agree with a workflow execution instruction among a plurality of job reservation times respectively corresponding to a plurality of jobs included in one workflow (for example, workflow 6). In other words, control unit 110 determines whether or not there is any execution instruction disagreement workflow.

If YES at step S310, the process proceeds to step S312. On the other hand, if NO at step S310, this process ends. It is noted that in the present embodiment it is assumed that workflow 6 exists as an execution instruction disagreement workflow. In this case, it is determined as YES at step S310, and the process proceeds to step S312.

In the processes following step S312, the starting time of the reserved job is changed. Specifically, at step S312, control unit 110 lists the job reservation times that do not agree with the interrelation of the execution timing between the jobs determined by a workflow execution instruction, among a plurality of job reservation times respectively corresponding to a plurality of jobs included in workflow 6 that is an execution instruction disagreement workflow. In the following, a job corresponding to the listed job reservation time is also referred to as an execution timing disagreement job.

Taking workflow 6 as an example, the interrelation between the job execution timings in the workflow execution instruction is defined such that jobs J6A, J6B, J6C should start to be executed at the same time. Therefore, jobs J6A and J6B are the execution timing disagreement jobs in workflow 6. In the present embodiment, it is assumed that k execution timing disagreement jobs are listed. Thereafter, the process proceeds to step S314.

At step S314, control unit 110 changes the job reservation time of the n-th execution timing disagreement job based on counter n, among k listed execution timing disagreement jobs, to the time that agrees with the interrelation between the job execution timings determined by the workflow execution instruction, according to rule A described above. Specifically, as for jobs J6A, J6B which are the execution timing disagreement jobs, the reservation times of jobs J6A, J6B are changed such that they are started at the same time as job J6C. Since job J6C has a competing license, job J6C is reserved at the time after the time when the use of the competing license is ended. It is noted that the initial value of counter n is 1. Thereafter, the process proceeds to step S316.

At step S316, it is determined whether or not there is license contention. Specifically, control unit 110 determines whether or not the changed job reservation time of the n-th execution timing disagreement job is the time at which license contention does not occur. If YES at step S316, the process goes to step S318. On the other hand, if NO at step S316, the process at step S314 is performed again. In this case, at step S314, control unit 110 changes the job reservation time of the n-th execution timing disagreement job to another time based on rule A as described above.

At step S318, it is determined whether or not the change of the job reservation time has been completed for all the execution timing disagreement jobs. Specifically, control unit 110 determines whether or not the value of counter n is k or greater. If YES at step S318, the process proceeds to step S320. On the other hand, if NO at step S318, the process proceeds to step S319.

At step S319, control unit 110 increments the counter n by 1. Thereafter, the process at step S314 is performed again.

At step S320, after the change of the job reservation time has been completed for all the execution timing disagreement jobs, control unit 110 again determines whether or not the reservation times of all the jobs included in the workflow agree with the workflow execution instruction and there is no license contention.

If YES at step S320, the license use management table optimizing process performed according to this rule A is ended. On the other hand, if NO at step S320, the process proceeds to step S322.

At step S322, control unit 110 sets the counter n to 1. Thereafter, the process at step S314 is performed again.

The change of one job reservation time may sometimes result in disagreement with a workflow execution instruction in relation with another job. However, a final determination is made at step S320 as described above, so that such an error can be eliminated, resulting in a reliable, license use management table optimizing process.

The process as described above resolves such a reservation state that does not agree with a workflow execution instruction, in a job that is reserved before the license use management table optimizing process is performed according to rule A. This always ensures the state in which there is agreement with a workflow execution instruction and no license contention occurs. In addition, when a job reservation time is changed as a result of the license use management table optimizing process, and thus a license to be used by a job becomes available, another job or workflow can make another reservation to use the available license. Therefore, the licenses can be utilized efficiently, and MFP can be operated efficiently.

In the license use management table optimizing process performed according to rule A in accordance with the present embodiment, control unit 110 changes the time at which jobs J6A, J6C are started to the time at which job J6C is started.

FIG. 14B visually shows the license use management table optimizing process performed according to rule A. FIG. 14C shows the reservation state of jobs based on a plurality of license reservation data after the license use management table optimizing process is performed according to rule A. Thus, contention for the license to be used is resolved.

Furthermore, by performing the license use management table optimizing process according to rule A, for example, a different job that satisfies a prescribed condition A may be set during the period (also referred to as period A hereinafter) from the time at which job J1A in FIG. 14C is ended to the time at which job J6A is started. Here, a prescribed condition A is a condition that the starting time is within the period A and the execution time is shorter than the duration of period A.

In the license use management table optimizing process, control unit 110 sets a reservation for a job in period A if the job satisfies the prescribed condition A described above. In FIG. 14A, if J6C is a job that uses function C for three minutes from the time seven minutes after time t0, then the license use management table optimizing process according to rule A as described above is not performed. In this case, the reservation state of jobs based on a plurality of license reservation data remains as FIG. 14A.

Figure 15A:
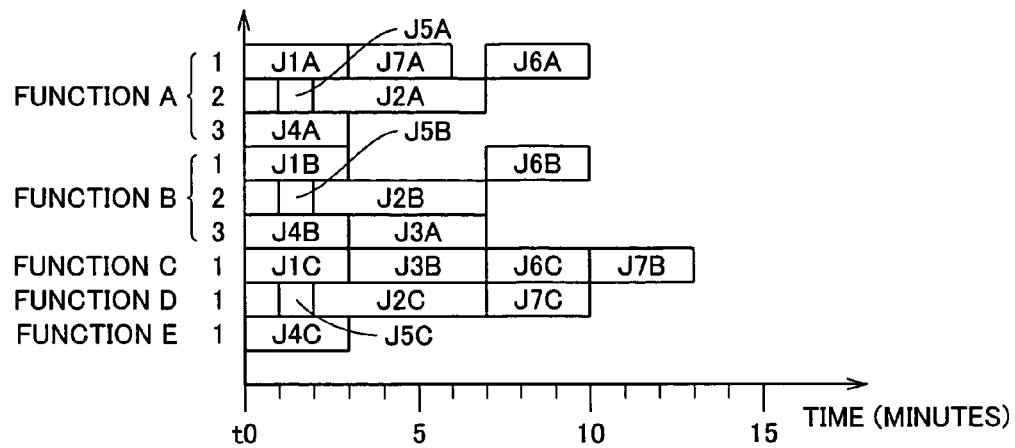
FIG. 15A, FIG. 15B, and FIG. 15C illustrate the reservation state of jobs based on a plurality of license reservation data.
Figure 15B:
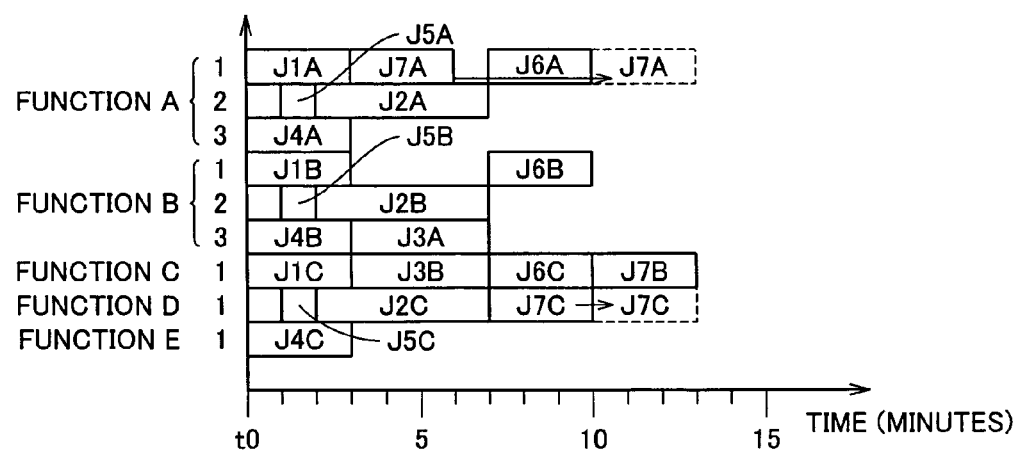
Figure 15C:
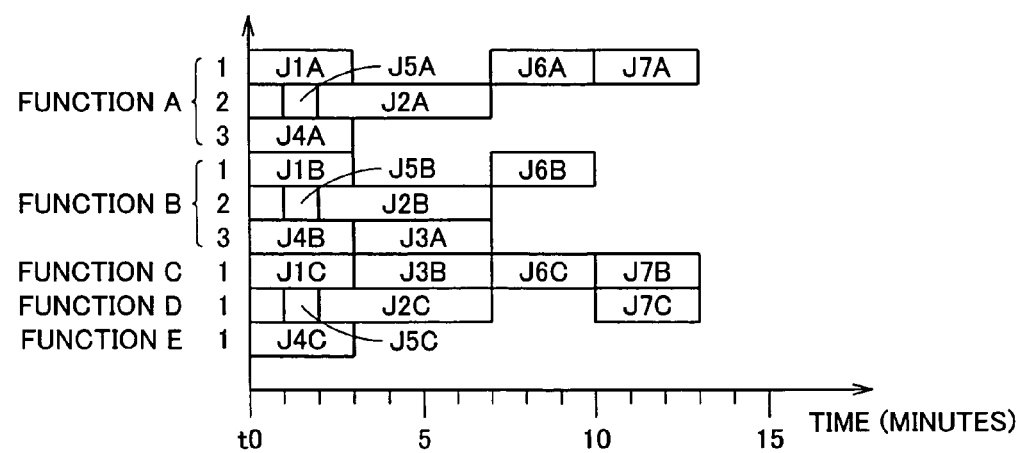

FIGS. 15A, 15B and 15C show the reservation state of jobs based on a plurality of license reservation data. FIG. 15A shows the reservation state of jobs based on the license reservation data, in which contention for the license to be used occurs. FIG. 15A differs from FIG. 14C in that a workflow 7 formed of jobs J7A, J7B, J7C is additionally reserved. Except for this point, FIG. 15A is similar to FIG. 14C and therefore the detailed description will not be repeated.

Jobs J7A, J7B, J7C use function A, function C, and function D, respectively, for three minutes from the time three minutes after time t0. In other words, jobs J7A, J7B, J7C are started at the same time. It is noted that in FIG. 15A, at the starting time of jobs J7B, J7C, jobs J3B, J2C have been already reserved. In other words, contention for the license to be used occurs. Therefore, the reservation times for jobs J7B, J7C are set at the times at which jobs J6C, J2C end, respectively.

When the reservation state of jobs based on a plurality of license reservation data is as shown in FIG. 15A, the license use management table optimizing process is performed according to the aforementioned rule A by control unit 110. In this case, in the license use management table optimizing process performed according to rule A, control unit 110 changes the times at which jobs J7A, J7C are started to the time at which job J7B is started.

FIG. 15B visually shows a license use management table optimizing process performed according to rule A. FIG. 15C shows the reservation state of jobs based on a plurality of license reservation data after the license use management table optimizing process is performed according to rule A. Thus, contention for the license to be used is resolved.

It is noted that a different job that satisfies the prescribed condition A can be set in the above-noted period A as described above by performing the license use management table optimizing process according to the aforementioned rule A.

Figure 16A:
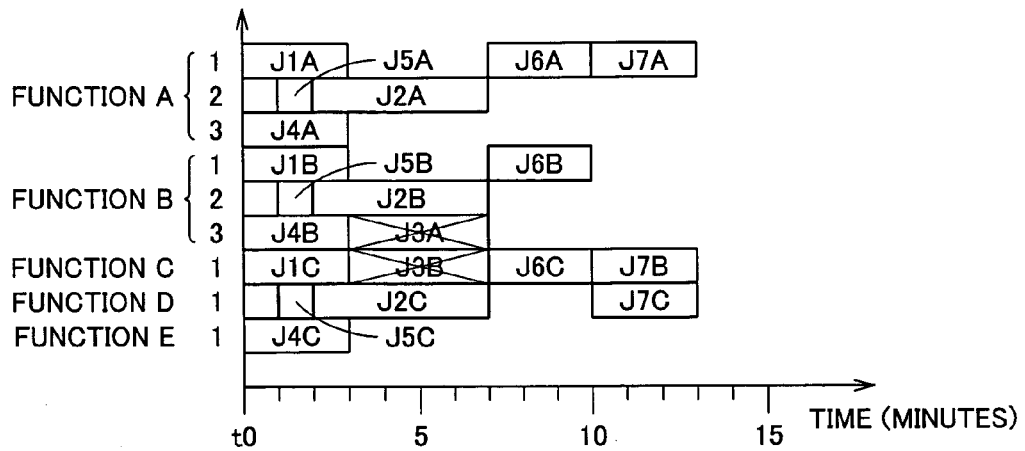
FIG. 16A, FIG. 16B, and FIG. 16C illustrate the reservation state of jobs based on a plurality of license reservation data.
Figure 16B:
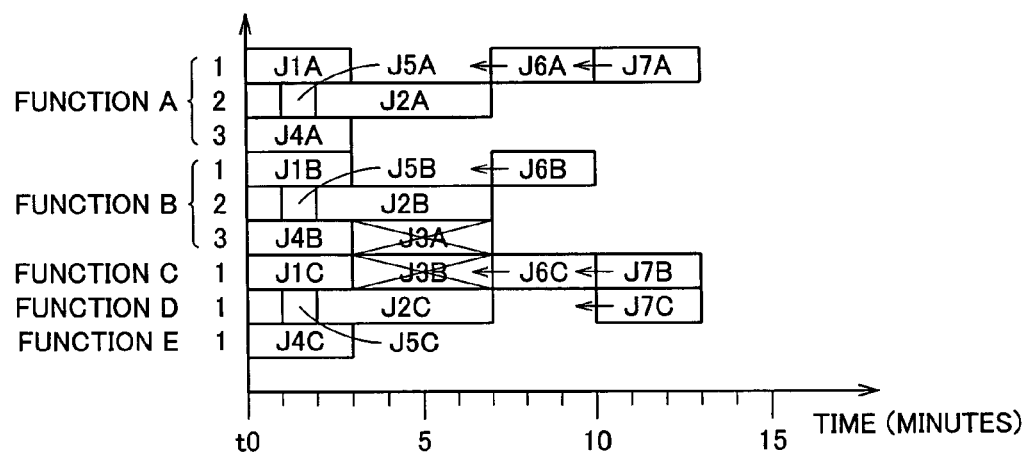
Figure 16C:
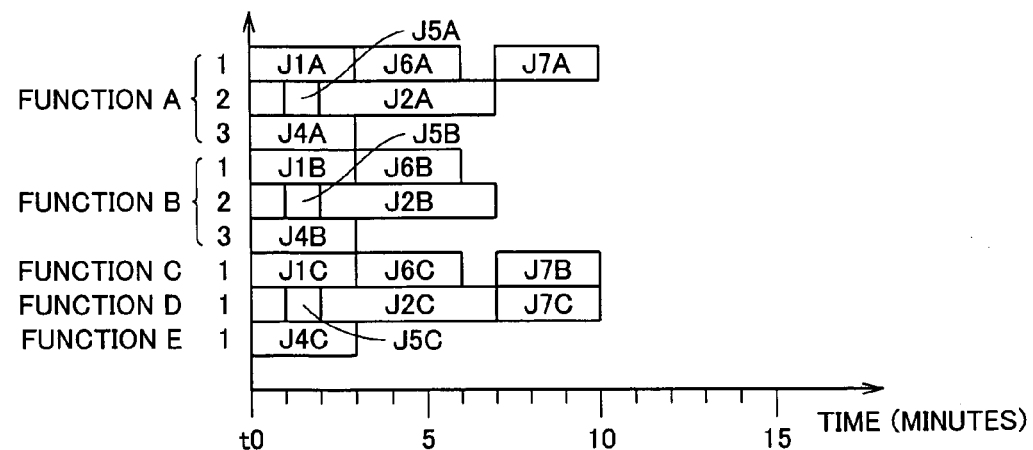

FIGS. 16A, 16B and 16C show the reservation state of jobs based on a plurality of license reservation data. FIG. 16A shows the reservation state of jobs based on license reservation state, in which a reserved job is deleted. Assume that jobs J3A, J3B are deleted jobs. In this case, FIG. 16A shows the reservation state of jobs based on license reservation data, in which contention for the license to be used does not occur. FIG. 16A differs from FIG. 15C in that jobs J3A, J3B are deleted. Except for this point, FIG. 16A is similar to FIG. 15C and therefore the detailed description will not be repeated.

When the reservation state of jobs based on a plurality of license reservation data is as shown in FIG. 16A, a license use management table optimizing process is performed according to the following rule B by control unit 110. According to rule B when the reserved job is deleted, the reservation time at which a job that is not deleted is started is changed to a time at which contention for the license to be used does not occur and which is earlier than the original reservation time. In the following, a workflow including a job of which starting time can be changed when a reserved job is deleted will also be referred to as a time changeable job-included workflow. For example, workflow 6, workflow 7 are the time changeable job-included workflows.

Here, a reservation of a job included in a workflow is changed, by way of illustration. However, needless to say, rule B is applied to a single job that is not included in a workflow, similarly.

Figure 18:
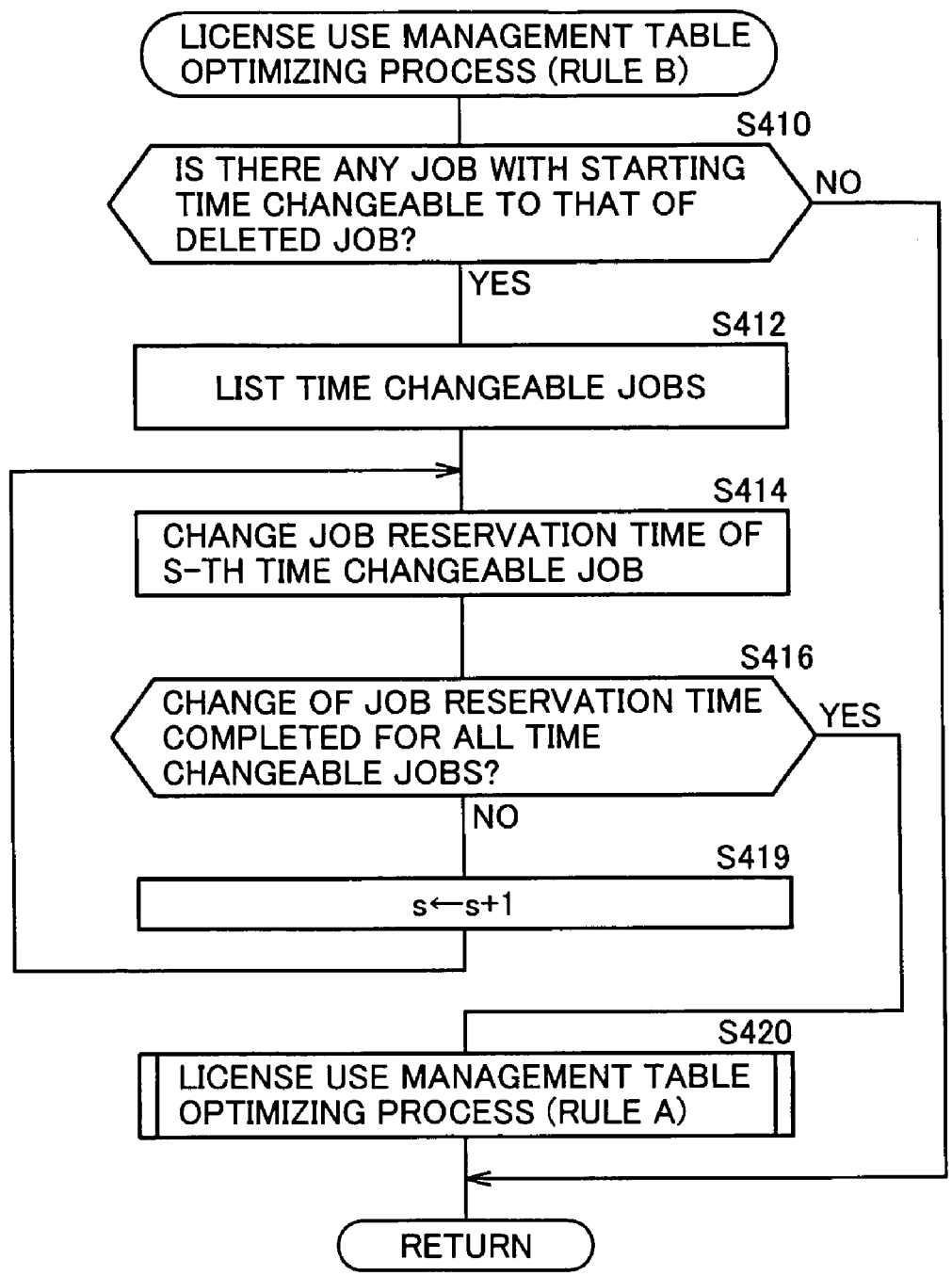
FIG. 18 is a flowchart of a license use management table optimizing process performed according to rule B.

FIG. 18 is a flowchart of the license use management table optimizing process performed according to rule B. Referring to FIG. 18, at step S410, control unit 110 determines whether or not there exists any job of which starting time can be changed to that of a deleted job. In other words, control unit 110 determines whether or not there exists a time changeable job-included workflow.

Specifically, control unit 110 examines if a reservation of a job exists after the reservation time of the deleted job. If there exists a reservation of a job, and if the license use time corresponding to the reservation of the job is equal to or shorter than the time during which a reservation can be made because of deletion of the job, then there exists a job of which starting time can be changed to that of the deleted job.

If YES at step S410, the process proceeds to step S412. On the other hand, if NO at step S410, this process ends. It is noted that in the present embodiment workflow 6 and workflow 7 exist as time changeable job-included workflows. In this case, it is determined as YES at step S410, and then the process proceeds to step S412.

In the process following step S412, the starting time of the reserved job is changed. Specifically, at step S412, control unit 110 lists jobs of which starting time becomes changeable because of deletion of the reserved job, among a plurality of jobs included in a corresponding workflow, for each of workflow 6 and workflow 7 as time changeable job-included workflows. In the following, a job of which starting time becomes changeable is also referred to as a time changeable job. In the present embodiment, it is assumed that r time changeable jobs are listed in both workflow 6 and workflow 7. Thereafter, the process proceeds to step S414.

At step S414, control unit 110 changes the job reservation time of the s-th time changeable job based on a counter s, among r time changeable jobs as listed, to the earliest time at which contention for the license to be used does not occur, based on the aforementioned rule B. It is noted that the initial value of counter s is 1. Thereafter, the process proceeds to step S416.

At step S416, it is determined whether or not the change of the job reservation time is completed for all the time changeable jobs. Specifically, control unit 110 determines whether or not the value of counter s is r or greater. If YES at step S416, the process proceeds to step S420. On the other hand, if NO at step S416, the process proceeds to step S419.

At step S419, control unit 110 increments counter s by 1. Thereafter, the process at step S414 is performed again.

Now, the processes from step S414 to step S419 will be described specifically. The times at which jobs J6A, J6B, J6C as time changeable jobs are started are changed to the time at which job J1A is ended. In addition, the times at which jobs J7A, J7B, J7C are started are changed to the time at which job J2A is ended. In other words, the job starting time is advanced by changing to the time at which contention for the license to be used is resolved and which is earlier than the original reservation time.

The license use management table optimizing process performed according to rule B substantially includes the processes preceding the process at step S420. In this way, according to rule B, execution of a workflow can be completed at the earliest time for the user without wasting an available license that is brought about by deleting a job. As a result, MFP can be operated efficiently.

At the following step S420, control unit 110 performs a license use management table optimizing process again according to rule A. Thereafter, the license use management table optimizing process according to rule B and rule A ends.

As described above, the license use management table optimizing process according to rule A is performed after the license use management table optimizing process according to rule B, thereby ensuring that the reservation times for all the jobs included in a workflow agree with a workflow execution instruction and that no license contention occurs. In other words, even when disagreement with a workflow execution instruction is caused in relation with other jobs by changing one or more job reservation times through the license use management table optimizing process according to rule B, such inconsistency can be resolved. As a result, a license use management table optimizing process can be performed to allow a reliable operation without contradiction.

FIG. 16B visually shows a license use management table optimizing process performed according to rule B. FIG. 16C shows the reservation state of jobs based on a plurality of license reservation data after the license use management table optimizing process is performed according to rule B. Thus, contention for the license to be used is resolved, and the starting times of jobs J6A, J6B, J6C, J7A, J7B, J7C are advanced.

Through the processes as described above, the job starting time is changed. In other words, the starting time of use of license reservation data is changed. As a result, license use management table T300 is optimized.

It is noted that in the license use management table optimizing process, if contention for the license to be used occurs, control unit 110 may perform a process of optimizing license use management table T300 according to a prescribed rule C as follows. The optimizing process is performed on the license reservation data corresponding to a license having the overlapping license for the function to be used and the overlapping use time (also referred to as overlapping license reservation data hereinafter), among a plurality of license reservation data set as "reserved".

It is noted that the optimizing process may be performed on the license reservation data corresponding to a license only having the overlapping license for the function to be used, among a plurality of license reservation data set as "reserved".

The prescribed rule C includes first to third rules. The first rule is such that when a plurality of overlapping license reservation data include those having the same registerer IP address, higher priorities are assigned to those having smaller workflow numbers. In one MFP, the workflow numbers each issued by a reservation to execute a workflow are often assigned in the time order in which they are reserved. It can be determined that if some license reservation data include the same registerer IP address, they are reserved from the same MFP.

For example, the overlapping license reservation data corresponding to management number 106 and the overlapping license reservation data corresponding to management number 108 have the same registerer IP address. In this case, the overlapping license reservation data corresponding to management number 108 has a workflow number smaller than the overlapping license reservation data corresponding to management number 106. It can be determined that if overlapping license reservation data having the same registerer, IP address has a smaller workflow number, it is reserved at an earlier time. Therefore, it may be appropriate to assign a higher priority.

Therefore, the order of priority of the overlapping license reservation data corresponding to management number 108 is set higher than the order of priority of the overlapping license reservation data corresponding to management number 106. As a result, the order of priority of the overlapping license reservation data corresponding to management number 108 is changed from "2" to "1". The order of priority of the overlapping license reservation data corresponding to management number 106 is changed from "1" to "2".

When a workplace has a plurality of MFPs, the same user can reserve execution of workflows starting at the same time at a plurality of MFPs. In that case, license contention may occur among those workflows.

The second rule is such that if a plurality of overlapping license reservation data include those registered by the same user, higher priorities are given to those having earlier registration date and times. For example, the overlapping license reservation data corresponding to management number 106 and the overlapping license reservation data corresponding to management number 110 are registered by the same user. In this case, the overlapping license reservation data corresponding to management number 110 has a registration date and time earlier than the overlapping license reservation data corresponding to management number 106. Therefore, the order of priority of the overlapping license reservation data corresponding to management number 110 is set higher than the order of priority of the overlapping license reservation data corresponding to management number 106.

When one user occupies the same license for a long time, another user who wants to use that license for a short time has to wait for a long time until the license becomes available. Therefore, it may be extremely inconvenient for the latter user.

The third rule is such that if a plurality of overlapping license reservation data include data having the time of use equal to or longer than a first prescribed time (for example, thirty minutes), the priority of such data is replaced by the priority of data having the time of use equal to or shorter than a second prescribed time (for example, two minutes). For example, the overlapping license reservation data corresponding to management number 112 has the duration of use equal to or longer than the first prescribed time (for example, 30 minutes). In this case, the order of priority of the overlapping license reservation data corresponding to management number 112 is replaced by the order of priority of the overlapping license reservation data corresponding to management number 114 having the duration of use equal to or shorter than the second prescribed time (for example, two minutes).

In the following, a license use management table optimizing process performed according to the third rule of rule C will be described with reference to the figures.

Figure 19A:
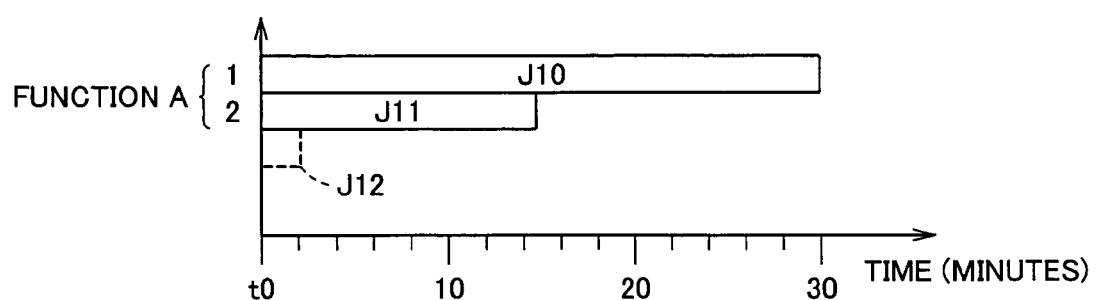
FIG. 19A and FIG. 19B illustrate the reservation state of jobs based on a plurality of license reservation data.
Figure 19B:
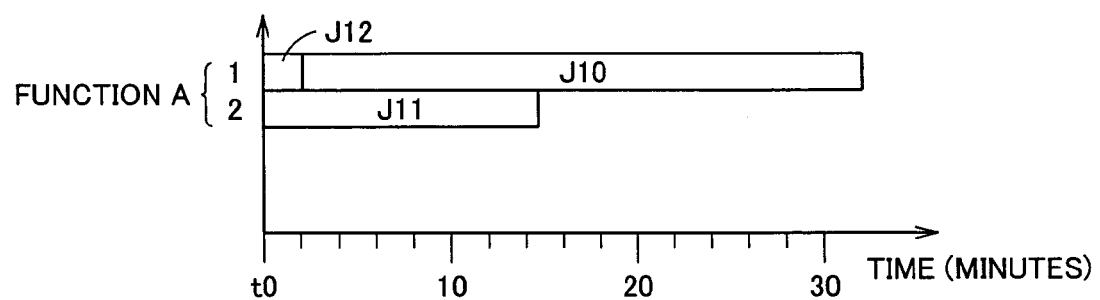

FIGS. 19A and 19B show the reservation state of jobs based on a plurality of license reservation data. FIG. 19A shows the reservation state of jobs based on license reservation data, in which contention for the license to be used occurs.

Referring to FIG. 19A, function A is, for example, a scan function. In FIG. 19A, the horizontal axis represents the elapsed time from time to, which is expressed in minutes by way of example. It is noted that the number of licenses for function A is two by way of example. Each of jobs J10, J11, J12 is a single job rather than a job included in one workflow. Job J10 uses function A for thirty minutes from time t0. Job J11 uses function A for fifteen minutes from time t0. Job J12 uses function A for two minutes from time t0.

Job J10 has the time of use equal to or longer than the first prescribed time (for example, thirty minutes). Job J12 has the time of use equal to or shorter than the second prescribed time (for example, two minutes).

As shown in FIG. 19A, there is license contention, and jobs J10, J11, J12 cannot make a reservation to use the license at time t0. Then, according to the third rule of rule C as described above, the license use management table optimizing process is performed by control unit 110. In the license use management table optimizing process performed according to the third rule of rule C, the order of priority of job J10 is replaced by the order of priority of job J12 having the duration of use equal to or shorter than the second prescribed time (for example, two minutes).

FIG. 19B shows the reservation state of jobs based on a plurality of license reservation data after the license use management table optimizing process is performed according to the third rule of rule C.

Because of the processes as described above, the license can be efficiently used, taking the convenience of a plurality of uses into consideration.

It is noted that priorities applied to the first to third rules may be set. For example, assume that the first rule has the highest priority and the third rule has the lowest priority. In this case, in the optimizing process, the process is performed according to the corresponding rule in the order of the first to third rules. Furthermore, if two or more rules of the first to third rules overlap, only a process according to the rule having a higher priority is performed. For example, when the registerer IP address and the user that has made registration are the same, only a process according to the first rule is performed.

As described above, if the priorities are set among the rules, even when the rules overlap with each other, the process order can be decided automatically without asking the user.

If a plurality of overlapping license reservation data having the priorities changed through the optimizing process include those having the overlapping time of use, and the number of corresponding licenses is not enough in the overlapping time of use, control unit 110 changes the starting time of use of the overlapping license reservation data having a lower priority to the time at which no overlap takes place after the time of use of the overlapping license reservation data having a higher priority.

Through the process as described above, the license use management table T300 is optimized. It is noted that a prescribed rule is not limited to three rules such as the first to third rules and may be formed of four or more rules. Furthermore, the first to third rules as described above are illustrated only by way of example and the rules may have different contents. Upon the end of the process at step S227A, the process proceeds to step S227B.

At step S227B, control unit 110 determines whether or not the present time is after the "starting time of use" or the changed "starting time of use" of the received data. The changed "starting time of use" refers to the time when "starting time of use" is changed through the process at step S227A. If YES at step S227B, the process proceeds to step S227C. On the other hand, if NO at step S227B, the process at step S227B is repeated again.

At step S227C, control unit 110 performs a license use management table updating process. In the license use management table updating process, a notice of the contents of the setting of the license reservation data having the starting time of use changed through the license use management table optimizing process is given to the client device that has registered the changed license reservation data. It is noted that if there is no license reservation data having the starting time to use changed through the license use management table optimizing process, control unit 110 does not give a notice. Thereafter, the license use management table updating process A ends, and the process returns to the management apparatus process A in FIG. 8 and proceeds to step S230 subsequent to step S220.

When the process at step S230 described above is performed, the process at step S232 is performed, and control unit 110 transmits a grant notice having a status indicating "success" to the client device that has transmitted license grant request information.

Referring to FIG. 7 again, at the client device, the license acquisition process is ended through the aforementioned processes at steps S132, S133, and the process returns to the client device process A in FIG. 4 and proceeds to step S140 subsequent to step S130.

Referring to FIG. 4 again, at the client device, the process at step S140 is performed. At step S140, the workflow registered at step S110 is executed. Upon the completion of the execution of the workflow, the aforementioned process at step S150 is performed, and the client device process A ends.

Through the processes as described above, in the present embodiment, the license use management table T300 is optimized according to a prescribed rule, so that the license reservation can be managed efficiently. Therefore, even when the license required for execution of the registered workflow is being used, the time until it becomes available can be shortened efficiently. This results in an effect that jobs and workflows are executed efficiently.

Referring to FIG. 7 again, at the client device, if NO at the aforementioned step S132 or step S133, the process proceeds to step S134.

At step S134, it is determined whether or not a cancel operation of a workflow takes place. A cancel operation refers to a press operation on input unit 164 or display unit 162 by the user to cancel execution of a workflow registered at step S110. Specifically, control unit 110 determines whether or not a cancel operation takes place. If YES at step S134, the process proceeds to step S137. On the other hand, if NO at step S134, the process proceeds to step S135.

At step S135, control unit 110 determines whether or not a prescribed time (for example, thirty minutes) has passed after the process at step S131 is performed. If YES at step S135, the process proceeds to step S137. On the other hand, if NO at step S135, the process at step S132 is performed again.

At step S137, control unit 110 transmits a license grant request cancel notice to the license management apparatus. The license grant request cancel notice is a notice for canceling execution of the workflow registered at the aforementioned step S110. Thereafter, the license acquisition process ends, and the process returns to the client device process A in FIG. 4. Then, the client device process A also ends.

When control unit 110 receives the license grant request cancel notice, the license management apparatus performs the following cancel notice reception process. In the cancel notice reception process, even during the license use management table updating process A in FIG. 10, the license use management table updating process A is halted immediately. It is noted that if the license reservation data corresponding to the above-noted license grant request information has already been registered in the license use management table T300, control unit 110 deletes the corresponding license reservation data from the license use management table T300. Thereafter, the process at step S220 in FIG. 8 is ended, and the process then proceeds to step S210. It is noted that the process of determination as to whether or not the license grant request cancel notice is received is performed by control unit 110 independently of the process in FIG. 8.

Furthermore, control unit 110 of the license management apparatus performs a process of continuously monitoring network 210 (referred to as a network monitoring process hereinafter) independently of the process in FIG. 8. In the network monitoring process, when control unit 110 detects that the client device that has created license grant request information cannot communicate data with network 210 due to power cut-off and the like, control unit 110 performs a process similar to the aforementioned cancel notice reception process, followed by the process at step S210.

It is noted that the license use management table T300 in FIG. 9 illustrated by way of example is a table that mainly manages a scan function, a print function, and the like, which may be basic functions in MFP. However, according to the present invention, the functions of MFP can be sorted into a basic function and an applied function, and licenses may not be shared for the basic function while the license use may be managed only for the applied function.

The basic function includes a scan function, a print function, and the like as described above. The applied function includes, for example, a facsimile function, a file transmission function, an image processing function, a file format conversion function, and an OCR function. As described above, the file transmission function is a function of transmitting data. The image processing function is a function of performing a process of editing, processing, and converting images. The file format conversion function is a function of converting a format of a file. The OCR function is a function of recognizing characters and the like.

As described above, the present invention may also be realized by sharing the licenses for the applied functions, rather than sharing the basic functions. It is noted that the process in sharing the licenses for the applied functions is similar to the aforementioned-process except that the basic functions are replaced with the applied functions, and therefore the detailed description will not be repeated.

Therefore, when the license use is managed only for the applied functions, jobs and workflows can also be executed efficiently. FIG. 20 shows a license use management table T300A with the applied functions by way of example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A license management apparatus comprising:
   a reception unit that receives a grant request for a license for an operational function to be used from one of plural devices connected to a network, the requested license being among plural licenses for each operational function shared by a plurality of devices connected to a network;
   a determination unit that determines whether or not the license for which said grant request has been received is available;
   a control unit that controls an order of grant of said license based on a determination result from said determination unit and grant request information included in said grant request; and
   a reservation unit that reserves a use for a license determined to be unavailable by said determination unit, manages the use reservation based on whether contention exists with another use reservation for the unavailable license, and
   changes a reservation for the license to a time at which no contention for the license occurs, so that the reservation for the license agrees with an interrelation of an execution timing of plural jobs designated by said grant request to execute a workflow.

2. The license management apparatus according to claim 1, wherein said determination unit determines whether or not the license for which said grant request has been received is available, based on a number of said licenses for each said shared operational function and a reservation state of the license for each said shared operational function.

3. The license management apparatus according to claim 1, wherein said control unit controls the order of grant of the license for which said grant request has been received, by changing a use permission period of the license for which said grant request has been received according to a prescribed rule, for a license determined to be unavailable by said determination unit.

4. The license management apparatus according to claim 1, wherein said grant request information includes a kind of said operational function to be used and a period during which said operational function to be used is used.

5. A license management apparatus comprising:
   a reception unit that receives a grant request for a license for an operational function to be used, among licenses for each operational function shared by a plurality of devices connected to a network;
   a determination unit that determines whether or not the license for which said grant request has been received is available;
   a control unit that controls an order of grant of said license based on a determination result from said determination unit and grant request information included in said grant request; and
   a reservation unit that reserves a use for a license determined to be unavailable by said determination unit, changes the time of reservation for said license for which reservation cannot be made, to a time after a time at which use of the license that has caused a contention is ended, and changes a time of reservation for a license for which no contention occurs and which corresponds to a job included in said workflow, to a time that agrees with an interrelation of an execution timing of said job designated by said instruction to execute said workflow and at which no contention occurs for the license to be used.

6. The license management apparatus according to claim 5, wherein, said reservation unit changes a reservation time of said a reserved license to a time at which no contention for a license to be used occurs and which is earlier than said reservation time of said reserved license.

7. The license management apparatus according to claim 5, further comprising a notification unit that issues a notice of a use permission period of the license for which said grant request has been received to a device that has made said grant request for the license.

8. The license management apparatus according to claim 5, wherein, said control unit changes an order of grant of licenses other than said at least one license determined to be unavailable among said plurality of licenses.

9. A license management system comprising a license management apparatus managing a license and a client device in an environment in which said license is shared for each operational function shared by a plurality of devices connected to a network, wherein
   said client device includes
   a registration unit that registers a workflow including at least one job,
   an analysis unit that analyzes an operational function used in registered said workflow, and
   a transmission unit that transmits a grant request for a license for an operational function necessary to execute said workflow analyzed by said analysis unit, and
   said license management apparatus includes
   a reception unit that receives said grant request for a license,
   a determination unit that determines whether or not the license for which said grant request has been received is available, a control unit that controls an order of grant of said license based on a determination result from said determination unit and grant request information included in said grant request; and a reservation unit that reserves a use for a license determined to be unavailable by said determination unit, and manages the use reservation based on contention with another use reservation for the unavailable license.

10. A license management method comprising the steps of:

receiving, by a processor a grant request for a license for an operational function to be used, among licenses for each operational function shared by a plurality of devices connected to a network;

determining whether or not the license for which said grant request has been received is available;

controlling order of grant of said license based on a determination result at said determining step and grant request information included in said grant request; and making a use reservation for a license determined to be unavailable by said determination unit, wherein the use reservation is made based on contention with another use reservation for the unavailable license wherein when said grant request for a license is received a reservation for the license is changed to a time at which no contention for the license occurs, so that the reservation for the license agrees with an interrelation of an execution timing of plural jobs designated by said grant request to execute a workflow.

11. The license management method according to claim 10, wherein said determining step determines whether or not the license for which said grant request has been received is available, based on a number of licenses for each said shared operational function and a reservation state of the license for each said shared operational function.

12. The license management method according to claim 10, wherein said controlling step controls order of grant of the license for which said grant request has been received, by changing a use permission period of the license for which said grant request has been received according to a prescribed rule, for a license determined to be unavailable at said determining step.

13. The license management method according to claim 10, wherein said grant request information includes a kind of said operational function to be used and a period during which said operational function to be used is used.

14. A license management method comprising the steps of:

receiving, by a processor a grant request for a license for an operational function to be used, among licenses for each operational function shared by a plurality of devices connected to a network;

determining whether or not the license for which said grant request has been received is available;

controlling order of grant of said license based on a determination result at said determining step and grant request information included in said grant request; and making a use reservation for a license determined to be unavailable by said determination unit, wherein when said receiving step has received a grant request for a license for an operational function necessary to execute a workflow including at least one job, if contention occurs and a reservation cannot be made for a license to be used at a time designated by an instruction to execute said workflow, said step of making a use reservation includes the step of changing the time of reservation for said license for which reservation cannot be made, to a time after a time at which use of the license that has caused said contention is ended, and also changing a time of reservation of a license for which no contention occurs and which corresponds to a job included in said workflow to a time that agrees with an interrelation of an execution timing of said job designated by said instruction to execute said workflow and at which no contention occurs for the license to be used.

15. The license management method according to claim 14, wherein if a job that uses a reserved license is deleted, said step of making a use reservation includes the step of changing a reservation time of said reserved license to a time at which no contention for a license to be used occurs and which is earlier than said reservation time of said reserved license.

16. The license management method according to claim 14, further comprising the step of giving a notice of a use permission period of the license for which said grant request has been received to a device that has made said grant request for the license.

17. The license management method according to claim 14, wherein when said step of receiving a grant request has received a grant request for a plurality of licenses for each operational function used in a workflow including a plurality of jobs, if it is determined at said determining step that at least one license of said plurality of licenses is unavailable, said controlling step changes order of grant of licenses other than said at least one license determined to be unavailable among said plurality of licenses.

18. A recording medium having a license management program recorded thereon to be executed by a computer, said license management program including the steps of:

receiving a grant request for a license for an operational function to be used, among licenses for each operational function shared by a plurality of devices connected to a network;

determining whether or not the license for which said grant request has been received is available;

controlling order of grant of said license based on a determination result at said determining step and grant request information included in said grant request; and making a use reservation for a license determined to be unavailable by said determination unit, wherein the use reservation is made based on contention with another use reservation for the unavailable license wherein when grant request for a license is received a reservation for the license is changed to a time at which no contention occurs, so that the reservation for the license agrees with an interrelation of an execution timing of plural jobs designated by said grant request to execute a workflow.

19. A license management apparatus comprising:

a reception unit that receives a grant request for one of a plurality of licenses that are associated with one of a plurality of operational functions, the operational function being shared by a plurality of devices connected to a network, wherein a total number of licenses associated with each shared operational function is not more than a total number of devices on the network;

a determination unit that determines an availability of a license for an operational function associated with the grant request;

a reservation unit that manages a use reservation of a license based on the availability of the license and whether contention exists with another use reservation of the license and changes a reservation for the license to a time at which no contention occurs so that the reservation for the license with an interrelation of an execution timing of plural jobs designated by said grant request to execute a workflow; and a control unit that controls a sequence in which the licenses are granted to requesting devices based on a determination result of said determination unit, grant request information included in said grant request and associated use reservations.

20. The license management apparatus according to claim 19, wherein said determination unit determines the availability of the license, based on the total number of said licenses for the shared operational function, and at least one of a total number of licenses granted for the shared operational function and a total number of licenses reserved for the shared operational function.

21. The license management apparatus according to claim 19, wherein said control unit controls the sequence in which the licenses are granted to requesting devices, by changing a use permission period of the license for which said grant request has been received according to a prescribed rule.

22. The license management apparatus according to claim 19, wherein said grant request information includes a kind of said operational function to be used and a period during which said operational function to be used is used.

23. The license management apparatus according to claim 19, further comprising a reservation unit that reserves a use for a license determined to be unavailable by said determination unit.

24. A license management apparatus comprising:
a reception unit that receives a grant request for one of a plurality of licenses that are associated with one of a plurality of operational functions, the operational function being shared by a plurality of devices connected to a network, wherein a total number of licenses associated with each shared operational function is not more than a total number of devices on the network;
a determination unit that determines an availability of a license for an operational function associated with the grant request;
a control unit that controls a sequence in which the licenses are granted to requesting devices based on a determination result of said determination unit, grant request information included in said grant request,
a reservation unit that changes the time of reservation for said first license so that execution of the workflow is reserved after said contention is ended, and changes a time of reservation for a second license of the grant request for which no contention occurs and which corresponds to a second job included in said workflow, to a time that agrees with an interrelation of an execution timing of said at least one job designated by said instruction to execute said workflow and at which no contention occurs for the second license to be used.

25. The license management apparatus according to claim 24, wherein if a job that uses a reserved license is deleted, said reservation unit changes a reservation time of said reserved license to a time at which no contention with another license occurs and which is earlier than said reservation time of said reserved license.

26. The license management apparatus according to claim 24, further comprising a notification unit that issues a notice of a use permission period of the license for which said grant request has been received to a device that has made said grant request for the license.

27. The license management apparatus according to claim 24, wherein said control unit changes the sequence in which each license other than said at least one license determined to be unavailable among said plurality of licenses.

28. A license management system comprising a license management apparatus managing a license and a client device in an environment in which said license is shared for each operational function shared by a plurality of devices connected to a network, wherein a total number of licenses associated with each shared operational function is less than a total number of devices on the network, and wherein
said client device comprises:
a registration unit that registers a workflow including at least one job;
an analysis unit that analyzes an operational function used in registering said workflow; and
a transmission unit that transmits a grant request for a license associated with an operational function necessary to execute said workflow analyzed by said analysis unit; and
said license management apparatus comprises:
a reception unit that receives said grant request for a license;
a determination unit that determines an availability of the license of said received grant request;
a reservation unit that manages a use reservation of a license based on the availability of the license and whether contention exists with another use reservation of the license and changes a reservation for the license to a time at which no contention occurs, so that the reservation agrees with an interrelation of an execution timing of plural jobs designated by said grant request to execute a workflow; and
a control unit that controls a sequence in which said license is granted to said client device with respect to said plurality of devices connected to the network based on a determination result from said determination unit, grant request information included in said grant request, and associated use reservations.

29. A license management method comprising the steps of:
receiving, by a processor a grant request for one of a plurality of licenses that are associated with one of a plurality of operational functions, the operational function being shared by a plurality of devices connected to a network, wherein a total number of licenses associated with each shared operational function is not more than a total number of devices on the network;
determining an availability of a license for an operational function associated with the grant request;
managing a use reservation of a license based on the availability of the license and whether contention exists with another use reservation of the license; and
controlling a sequence in which the licenses are granted to requesting devices based on a determination result of said determination unit and grant request information included in said grant request,
wherein when said grant request is received reservation for the license is changed to a time at which no contention for the license occurs, so that the reservation agrees with an interrelation of an execution timing of plural jobs designated by said grant request to execute a workflow.

30. A recording medium having a license management program recorded thereon to be executed by a computer, said license management program including the steps of:
receiving a grant request for one of a plurality of licenses that are associated with one of a plurality of operational functions, the operational function being shared by a plurality of devices connected to a network, wherein a total number of licenses associated with each shared operational function is less than a total number of devices on the network;
determining an availability of a license for an operational function associated with the grant request;

managing a use reservation of a license based on the availability of the license and whether contention exists with another use reservation of the license; and controlling a sequence in which the licenses are granted to requesting devices based on a determination result of said determination unit, grant request information included in said grant request, and associated use reservations, wherein when said grant request is received a reservation for the license is changed to a time at which no contention occurs, so that the reservation agrees with an interrelation of an execution timing of said jobs designated by said grant request to execute said workflow.

* * * * *